US012598551B2

(12) United States Patent
Wu et al.

(10) Patent No.: US 12,598,551 B2
(45) Date of Patent: Apr. 7, 2026

(54) USER EQUIPMENT, BASE STATION, AND METHODS THEREOF, READABLE STORAGE MEDIUM

(71) Applicant: Samsung Electronics Co., Ltd., Suwon-si (KR)

(72) Inventors: Min Wu, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 18/185,779

(22) Filed: Mar. 17, 2023

(65) Prior Publication Data

US 2023/0300750 A1 Sep. 21, 2023

(30) Foreign Application Priority Data

Mar. 18, 2022 (CN) .......................... 202210272413.X

(51) Int. Cl.
*H04W 52/02* (2009.01)
*H04W 72/23* (2023.01)

(52) U.S. Cl.
CPC ....... *H04W 52/0232* (2013.01); *H04W 72/23* (2023.01)

(58) Field of Classification Search
CPC ... H04W 76/28; H04W 72/232; H04W 76/27; H04W 72/0453; H04W 72/12;

(Continued)

(56) References Cited

U.S. PATENT DOCUMENTS 11,252,668 B2 2/2022 Nory et al.
2019/0222290 A1* 7/2019 Ly ......................... H04B 7/0695
(Continued)

FOREIGN PATENT DOCUMENTS

WO 2020222615 A1 11/2020

OTHER PUBLICATIONS

International Search Report and Written Opinion of the International Searching Authority dated Jun. 27, 2023, in connection with International Application No. PCT/KR2023/003625, 9 pages.
(Continued)

*Primary Examiner* — Tu X Nguyen

(57) ABSTRACT

The disclosure relates to a 5G or 6G communication system for supporting a higher data transmission rate. Embodiments of the present disclosure provide a user equipment (UE), a base station and methods thereof, and a readable storage medium. The method comprises: monitoring a WUS; performing at least one of the following actions, based on a detected WUS: initiating or not starting a DRX-onDuration-Timer at a start position of a corresponding DRX cycle; starting a DRX timer after a first preset interval following the WUS, wherein, the UE monitors a PDCCH during the operation of the DRX timer; starting the PDCCH monitoring after a second preset interval following the WUS; entering into a non-power-saving state from a power-saving state after a third preset interval following the WUS, wherein the UE does not transmit and receive signals and/or channels other than the WUS in the power-saving state, and the UE is able to transmit and receive signals and/or channels in the non-power-saving state.

17 Claims, 9 Drawing Sheets

(58) Field of Classification Search
CPC ......... H04W 52/0219; H04W 74/0833; H04W
74/0838; H04W 74/0836; H04W 52/02
See application file for complete search history.

(56) References Cited

U.S. PATENT DOCUMENTS

| | | |
|---|---|---|
| 2021/0410067 A1 | 12/2021 | Miao et al. |
| 2022/0022281 A1 | 1/2022 | Wang et al. |
| 2022/0070766 A1 | 3/2022 | Haque et al. |
| 2023/0041767 A1* | 2/2023 | Manolakos ........... H04W 76/28 |
| 2023/0199650 A1* | 6/2023 | Pal ................... H04W 52/0216 |
| | | 370/311 |

OTHER PUBLICATIONS

Huawei, et al., "Remaining issues on PDCCH based power saving," R1-2003518, 3GPP TSG RAN WG1 Meeting #101-e, E-meeting, May 25-Jun. 5, 2020, 9 pages.

Mediatek Inc, "Remaining issues on PDCCH-based power saving signal," R1-2003664, 3GPP TSG RAN WG1 #101, e-Meeting, May 25-Jun. 5, 2020, 4 pages.

Supplementary Partial European Search Report dated Jun. 17, 2025, in connection with European Application No. 23771148.6, 15 pages.

Supplementary European Search Report dated Sep. 17, 2025, in connection with European Application No. 23771148.6, 13 pages.

* cited by examiner

The WUS indicates that the UE starts or does not start the DRX-onDurationTimer at the start position of the next DRX cycle     The WUS indicates that the UE starts or does not start the DRX-onDurationTimer at the start position of the next DRX cycle

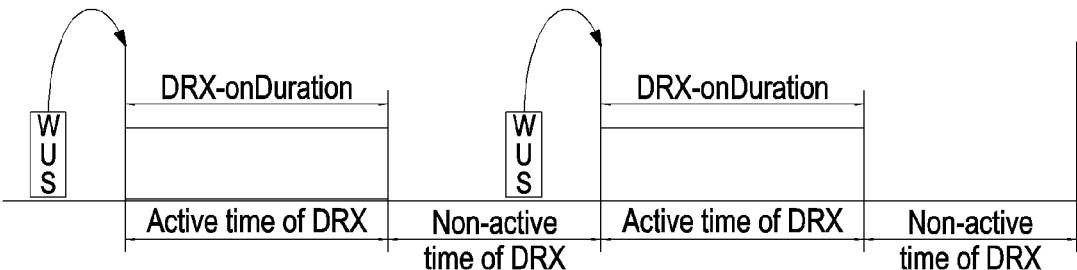

FIG. 5

The WUS indicates that the UE starts or does not start the DRX-onDurationTimer at the start position of the next two DRX cycle

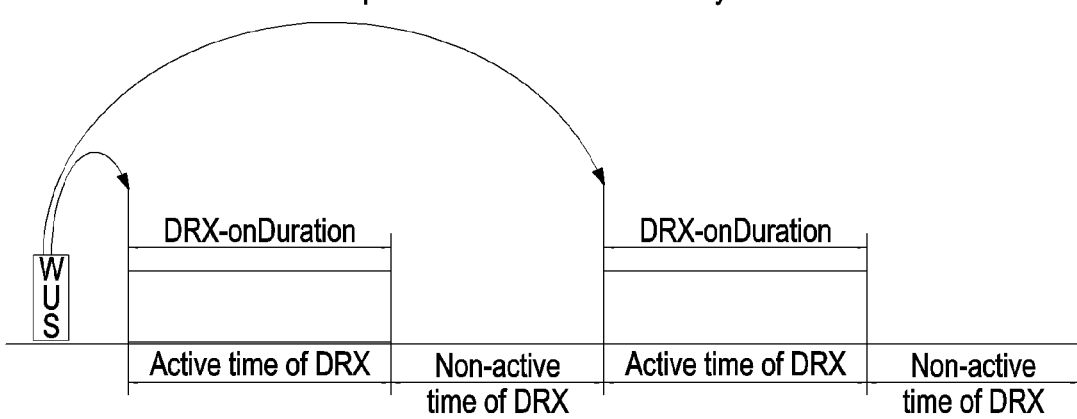

FIG. 6

The WUS indicates that the UE
starts or does not start the
DRX-onDurationTimer

The WUS indicates that the UE
starts or does not start the
DRX-onDurationTimer

USER EQUIPMENT, BASE STATION, AND METHODS THEREOF, READABLE STORAGE MEDIUM

CROSS-REFERENCE TO RELATED APPLICATION

This application claims priority under 35 U.S.C. § 119(a) to Chinese Patent Application Serial No. 202210272413.X, which was filed in the Chinese Patent Office on Mar. 18, 2022, the entire disclosure of which is incorporated herein by reference.

BACKGROUND

1. Field

The present disclosure relates to the technical field of wireless communication, and more particularly, to a user equipment (UE), a base station and methods thereof, and a readable storage medium.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies. At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In wireless mobile communication systems, reducing the power consumption of UE and thus extending the battery life has always been an important research direction. In a 5G New Radio (NR) system, due to the large bandwidth transmission and Beam Sweeping mechanism at high frequency, the power consumption of UE is more serious than that of a 4G LTE system, and power-saving research is especially important to achieve better power control than UE of 4G LTE.

SUMMARY

Embodiments of the present disclosure provide a user equipment, a base station, and methods thereof, a readable storage medium that aim at avoiding unnecessary Physical Downlink Control Channel (PDCCH) monitoring, thereby achieving a reduction of power consumption of UE.

According to one aspect of embodiments of the present disclosure, a method performed by a UE is provided, comprising:

monitoring a wake up signal (WUS);

performing at least one of the following actions, based on a detected WUS;

starting or not starting a DRX-onDurationTimer at a start position of the corresponding discontinuous reception (DRX) cycle;

starting the DRX timer after a first preset interval following the WUS, wherein the UE monitors the PDCCH during the operation of the DRX timer;

starting the PDCCH monitoring after a second preset interval following the WUS; or entering into a non-power-saving state from a power-saving state after a third preset interval following the WUS, wherein the UE does not transmit and receive signals and/or channels other than the WUS in the power-saving state, and the UE is able to transmit and receive signals and/or channels in the non-power-saving state.

Optionally, the corresponding DRX cycle comprises at least one of the followings:

a first DRX cycle after the WUS; or $N_1$ consecutive DRX cycles after the WUS, wherein $N_1$ is a positive integer and $N_1$ is predefined or pre-configured.

Optionally, when the DRX cycle is configured to include two sizes of DRX cycles, wherein the first DRX cycle is larger than the second DRX cycle, the corresponding DRX cycle comprises at least one of the followings:

a first "first DRX cycle" after the WUS;

a first "second DRX cycle" after WUS; or $N_1$ consecutive second DRX cycles after the WUS.

Optionally, the UE comprises a primary connection receiver (PCR) and a wake up receiver (WUR), wherein the PCR is configured to receive signals and/or channels other than the WUS, the WUR is configured to receive the WUS, the power-saving state is a state where the PCR is turned off and the non-power-saving state is a state where the PCR is turned on.

Monitoring the WUS comprises:

monitoring the WUS via the WUR;

Entering into the non-power-saving state from the power-saving state comprises; or starting the PCR.

Optionally, upon entering into the non-power-saving state from the power-saving state, a first activated downlink bandwidth part (BWP) or uplink BWP comprises at least one of the followings:

a pre-configured first activated BWP;

an initial BWP;

a default BWP;

a dormant BWP; or a first activated BWP after entering into a non-power-saving state.

Optionally, the method further comprises:

entering into the power-saving state from the non-power-saving state based on the received indication of the MAC CE or DCI.

Optionally, the method further comprises at least one of the followings:

not monitoring the WUS during active time of DRX; or not monitoring the WUS in the non-power-saving state.

Optionally, a time domain position of the WUS is determined based on a reference position and a time domain offset with respect to the reference position, wherein the reference position comprises at least one of the followings:

the start position of the corresponding DRX cycle; or a reference synchronization signal block (SSB).

Optionally, monitoring the WUS comprises:

monitoring the WUS on at least one WUS resource within a WUS monitoring window.

Optionally, a time domain position of the WUS monitoring window is determined based on at least one of the followings:

a start position of the WUS monitoring window is determined based on the reference position and a time domain offset with respect to the reference position indicated by a base station;

the start position of the WUS monitoring window is determined based on an end position of the WUS monitoring window, and a length of the WUS monitoring window;

the end position of the WUS monitoring window is determined based on the reference position and the time domain offset with respect to the reference position indicated by the base station;

the end position of the WUS monitoring window is determined based on the start position of the WUS monitoring window, and the length of the WUS monitoring window; and the end position of the WUS monitoring window is determined based on the reference position and a minimum interval reported by the UE with respect to the reference position, wherein the reference position comprises at least one of the followings:

a start position of the corresponding DRX cycle; or a reference SSB.

Optionally, an indicative granularity of the time domain offset comprises at least one of wireless frame, time slot, or symbol, and then when the indicative granularity of the time domain offset is a wireless frame, the time domain offset is an offset of the wireless frame in which the WUS is located with respect to the wireless frame in which the reference position is located; when the indicative granularity of the time domain offset is a time slot, the time domain offset is an offset of the time slot in which the WUS is located with respect to the time slot in which the reference position is located; when the granularity of the time domain offset is a symbol, the time domain offset is the offset of the start symbol of the WUS with respect to the start symbol in which the reference position is located.

Optionally, when the indicative granularity of the time domain offset is a wireless frame, the time domain position of the WUS is also determined based on the WUS position information within the wireless frame indicated by the base station; when the indicative granularity of the time domain offset is a time slot, the time domain position of the WUS is also determined based on the WUS position information within the time slot indicated by the base station.

Optionally, an interval between the time domain position of the WUS and the reference position is not less than a predetermined interval; and/or An interval between the end position of the WUS monitoring window and the reference position is not less than the predetermined interval, wherein the predetermined interval is a predefined minimum interval, or a minimum interval reported by the UE.

Optionally, the reference SSB comprises at least one of the followings:

a first SSB with an interval not less than the predetermined interval prior to the corresponding DRX cycle;

$N_2$th SSB with an interval not less than the predetermined interval prior to the corresponding DRX cycle, wherein Na is a positive integer;

a first SSB among $N_3$ consecutive SSBs, wherein $N_3$ is a positive integer.

Optionally, the time domain position of at least one WUS resource within the WUS monitoring window is determined based on at least one of the followings:

time domain interval information between two adjacent WUS resources, wherein, the start position of the WUS monitoring window is the start position of a first WUS resource; or bitmap information configured to indicate the presence or absence of the WUS resource on each time unit within the WUS monitoring window.

Optionally, starting the DRX timer after the first preset interval following the WUS comprises:

starting the DRX timer after the first preset interval starting from the end position of the WUS monitoring window;

starting the PDCCH monitoring after a second preset interval following the WUS comprises:

starting PDCCH monitoring after the second preset interval starting from the end position of the WUS monitoring window;

entering into the non-power-saving state from the power-saving state after a third preset interval following the WUS comprises; and entering into the non-power-saving state from the power-saving state after the third predetermined interval starting from the end position of the WUS monitoring window.

Optionally, the WUS is carried by a physical signal sequence.

Optionally, the WUS signal sequence is configured to carry at least one of the following status information:

an indication that the UE starts the DRX-onDuration-Timer at the start position of the corresponding DRX cycle; or an indication that the UE does not start DRX-onDurationTimer at the start position of the corresponding DRX cycle.

Optionally, carrying by the physical signal sequence comprises at least one of the followings:

carrying, by a WUS signal sequence, status information for instructing that the UE starts the DRX-onDuration-Timer at the start position of the corresponding DRX cycle;

carrying, by a WUS signal sequence, status information for instructing that the UE does not start the DRX-onDurationTimer at the start position of the corresponding DRX cycle; or carrying, by a first WUS signal sequence, status information for instructing that the UE starts the DRX-onDuration-Timer at the start position of the corresponding DRX cycle, and carrying, by a second WUS signal sequence, status information for instructing that the UE does not start the DRX-onDurationTimer at the start position of the corresponding DRX cycle.

Optionally, the WUS signal sequence is an M sequence or a Gold sequence.

Optionally, the WUS signal sequence is generated and/or scrambled based on at least one of the following parameters:

a physical cell ID;

a C-RNTI of the UE;

an index number of the system frame in which the start position of the DRX cycle associated with the WUS is located;

an index number of the time slot in which the start position of the DRX cycle associated with the WUS is located;

an index number of the symbol in which the start position of the DRX cycle associated with the WUS is located;

an index number of the system frame in which the start position of the reference SSB associated with the WUS is located;

an index number of the time slot in which the start position of the reference SSB associated with the WUS is located;

an index number of the symbol in which the start position of the reference SSB associated with the WUS is located;

an index number of the system frame in which the start position of the WUS is located;

an index number of the time slot in which the start position of the WUS is located; or an index number of the symbol in which the start position of the WUS is located.

Optionally, the WUS signal sequence is mapped to a segment of continuous subcarrier of orthogonal frequency division multiplexing (OFDM) symbol, wherein two ends of the continuous subcarrier include a protection subcarrier, and no signal is transmitted on the protection subcarrier.

Optionally, the subcarrier spacing of the WUS comprises at least one of the followings:

a subcarrier interval of the initial downlink BWP configured in the cell System Information Block (SIB);

a subcarrier interval indicated by a common subcarrier interval parameter configured in the Physical Broadcast Channel (PBCH);

a subcarrier interval predefined based on a frequency band;

a subcarrier interval of the BWP in which the WUS is located; or a subcarrier interval configured specifically for the WUS.

Optionally, a frequency domain position of the WUS is indicated according to at least one of the following parameters:

a frequency domain offset with respect to a common reference point of a cell resource block grid;

a frequency domain offset with respect to the lowest frequency subcarrier or the highest frequency subcarrier of the BWP; or a frequency domain offset with respect to the lowest frequency subcarrier or the highest frequency subcarrier of the cell carrier bandwidth, wherein the cell carrier bandwidth is the cell carrier bandwidth based on the subcarrier spacing of the WUS.

Optionally, performing at least one of the following actions based on the detected WUS comprises:

transmitting an acknowledge (ACK) after the WUS is detected; or performing at least one of the following actions based on the detected WUS, after a fourth preset interval of transmitting the ACK.

Optionally, transmitting the ACK comprises at least one of the following ways:

transmitting the ACK via the physical uplink control channel (PUCCH); or transmitting an ACK via a dedicated physical signal sequence.

According to another aspect of embodiments of the present disclosure, a method performed by a base station is provided, and the method comprises:

transmitting a WUS to a UE, wherein the WUS is configured to indicate that the UE performs at least one of the following actions;

starting or not starting a DRX-onDurationTimer at a start position of the corresponding DRX cycle;

starting the DRX timer after a first preset interval following the WUS, wherein the UE monitors the PDCCH during the operation of the DRX timer;

starting the PDCCH monitoring after a second preset interval following the WUS; and entering into a non-power-saving state from a power-saving state after a third preset interval following the WUS, wherein the UE does not transmit and receive signals and/or channels other than the WUS in the power-saving state, and the UE is able to transmit and receive signals and/or channels in the non-power-saving state.

According to a further aspect of the present disclosure, a user equipment (UE) is provided, and the UE comprises:

a transceiver; and a processor coupled to the transceiver and configured to perform control to implement the steps of the method performed by the UE provided in the present disclosure.

According to a further aspect of the present disclosure, a base station is provided, and the base station comprises:

a transceiver; and a processor coupled to the transceiver and configured to perform control to implement the steps of the method performed by the base station provided in the present disclosure.

According to a further aspect of the present disclosure, a computer-readable storage medium having computer programs stored thereon is provided, wherein the computer programs, when executed by a processor, implement the steps of the method performed by the UE provided in the present disclosure.

According to a further aspect of the present disclosure, a computer-readable storage medium having computer programs stored thereon is provided, wherein the computer programs, when executed by a processor, implement the steps of the method performed by the base station provided in the present disclosure.

According to a further aspect of the present disclosure, a computer program product comprising computer programs is provided, wherein the computer programs, when executed by a processor, implement the steps of the method performed by the UE provided in the present disclosure.

According to a further aspect of the present disclosure, a computer program product comprising computer programs is provided, wherein the computer programs, when executed by a processor, implement the steps of the method performed by the base station provided in the present disclosure.

The UE, the base station, and the methods thereof, and the readable storage medium provided by the embodiments of the present disclosure can perform PDCCH monitoring at a specific time by waking up the UE via the WUS, thereby avoiding unnecessary PDCCH monitoring and effectively reducing the power consumption of the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to explain the technical solutions in the embodiments of the present disclosure more clearly, the drawings used in the description of the embodiments of the present disclosure will be briefly illustrated below:

FIG. 5 illustrates a diagram I of a WUS monitoring opportunity for DRX cycles according to embodiments of the present disclosure;

FIG. 6 illustrates a diagram II of a WUS monitoring opportunity for DRX cycles according to embodiments of the present disclosure;

DETAILED DESCRIPTION

Figure 1:
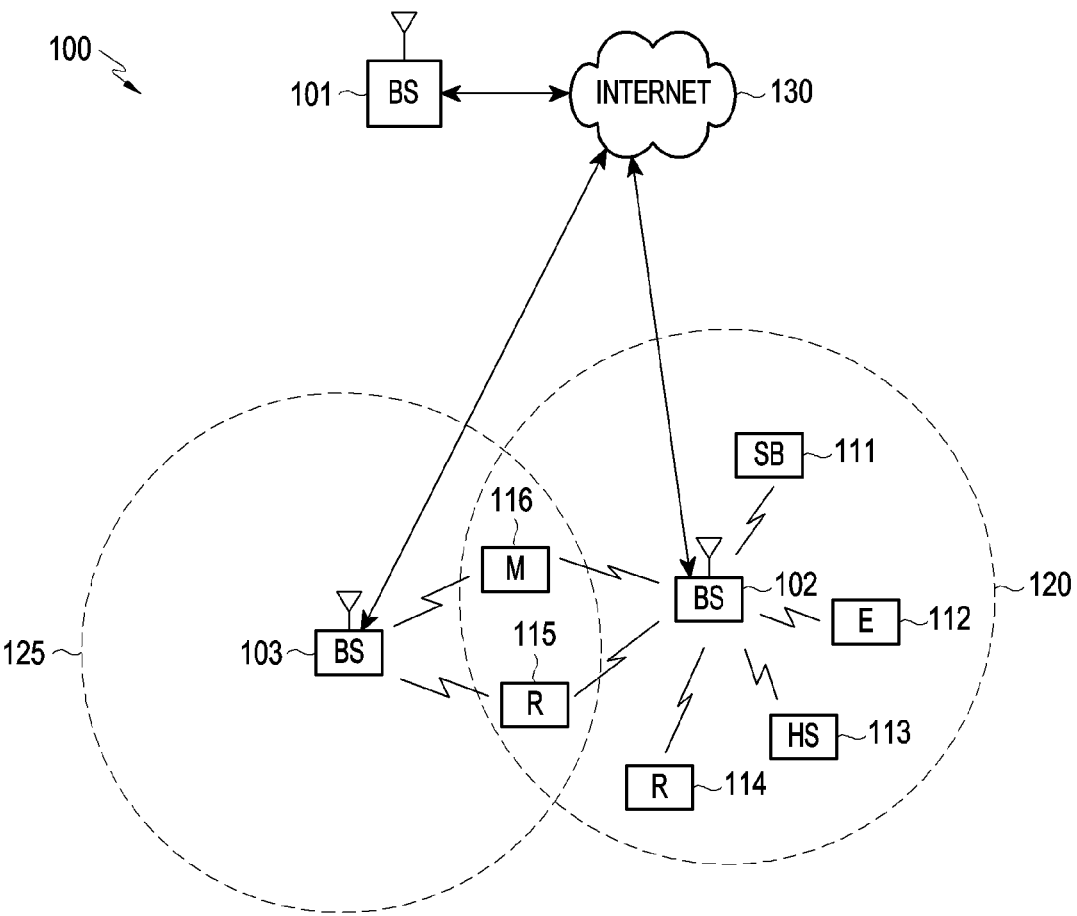
FIG. 1 illustrates a general structure of a wireless network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

To make the objects, the technical solutions and the advantages of embodiments of the present disclosure more apparent, the technical solutions of the embodiments of the present disclosure will be described in detail hereinafter in conjunction with the drawings of the embodiments of the present disclosure.

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

A gNB 102 provides wireless broadband access to the network 130 for a first plurality of user equipments (UEs) within a coverage area 120 of gNB 102. The first plurality of UEs include a UE 111, which may be located in a small business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figures 2A, 2B:
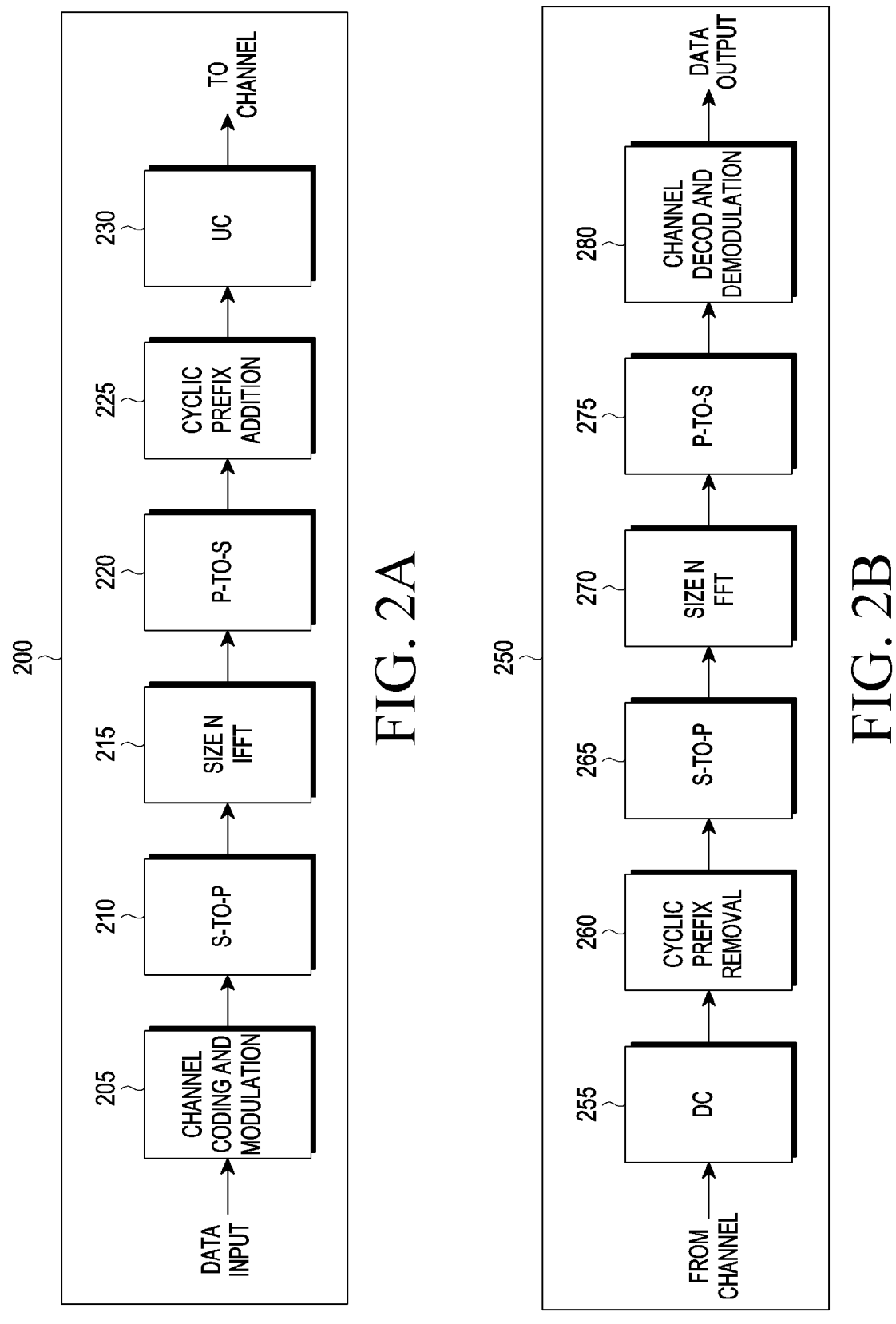
FIG. 2A illustrates a transmitting path according to embodiments of the present disclosure.
FIG. 2B illustrates a receiving path according to embodiments of the present disclosure.

FIGS. 2*a* and 2*b* illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2*a* and 2*b* can be implemented using only hardware, or using a combination of hardware and software/firmware. As a specific example, at least some of the components in FIGS. 2*a* and 2*b* may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2*a* and 2*b* illustrate examples of wireless transmission and reception paths, various changes may be made to FIGS. 2*a* and 2*b*. For example, various components in FIGS. 2*a* and 2*b* can be combined, further subdivided or omitted, and additional components can be added according to specific requirements. Furthermore, FIGS. 2*a* and 2*b* are intended to illustrate examples of types of transmission and reception paths that can be used in a wireless network. Any other suitable architecture can be used to support wireless communication in a wireless network.

Figure 3A:
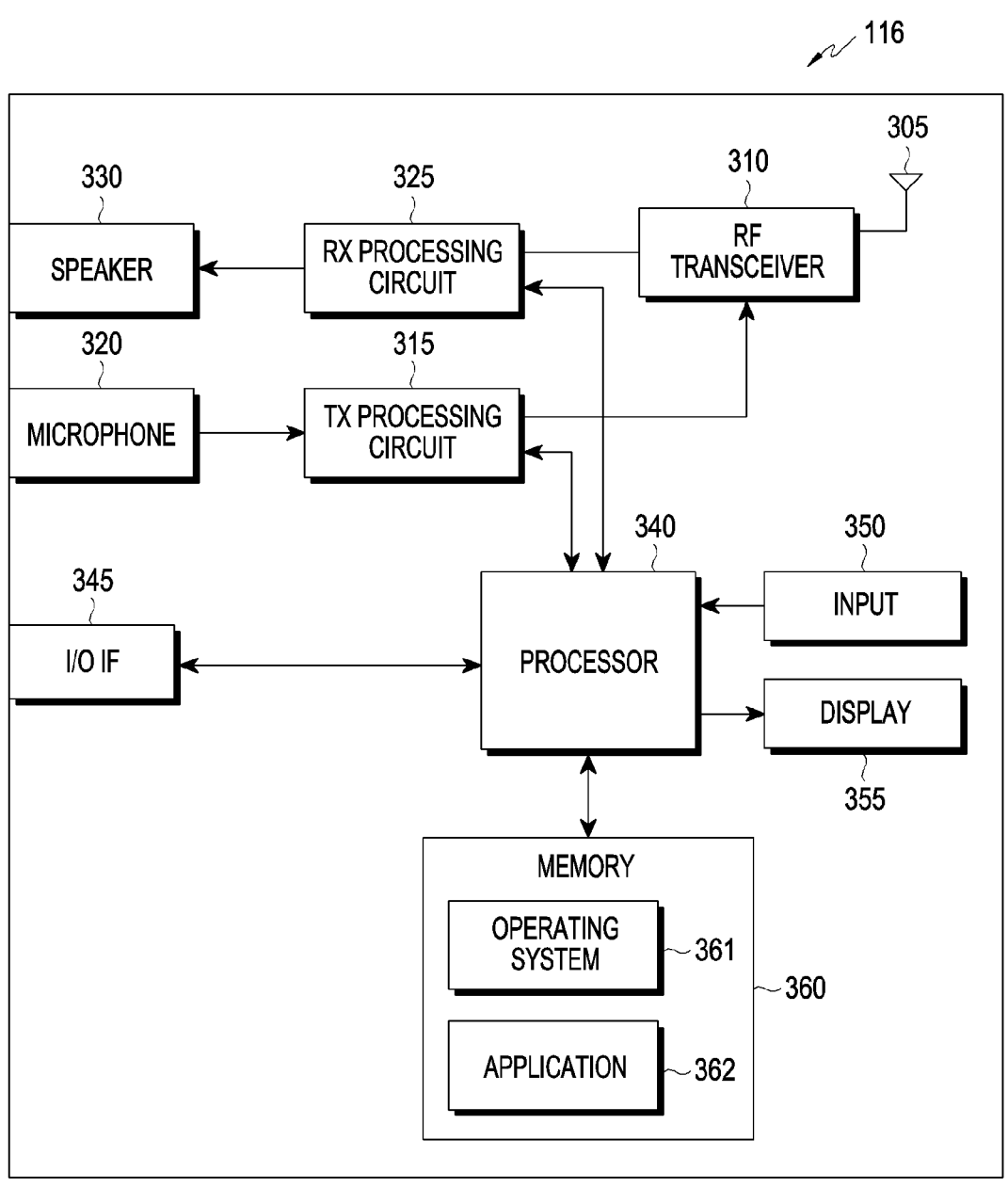
FIG. 3A illustrates a structure of a UE according to embodiments of the present disclosure.

FIG. 3*a* illustrates an example UE 116 according to the present disclosure. The embodiment of UE 116 shown in FIG. 3*a* is for illustration only, and UEs 111-115 of FIG. 1 can have the same or similar configuration. However, a UE has various configurations, and FIG. 3a does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3a illustrates an example of UE 116, various changes can be made to FIG. 3a. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3a illustrates that the UE 116 is configured as a mobile phone or a smart phone, UEs can be configured to operate as other types of mobile or fixed devices.

Figure 3B:
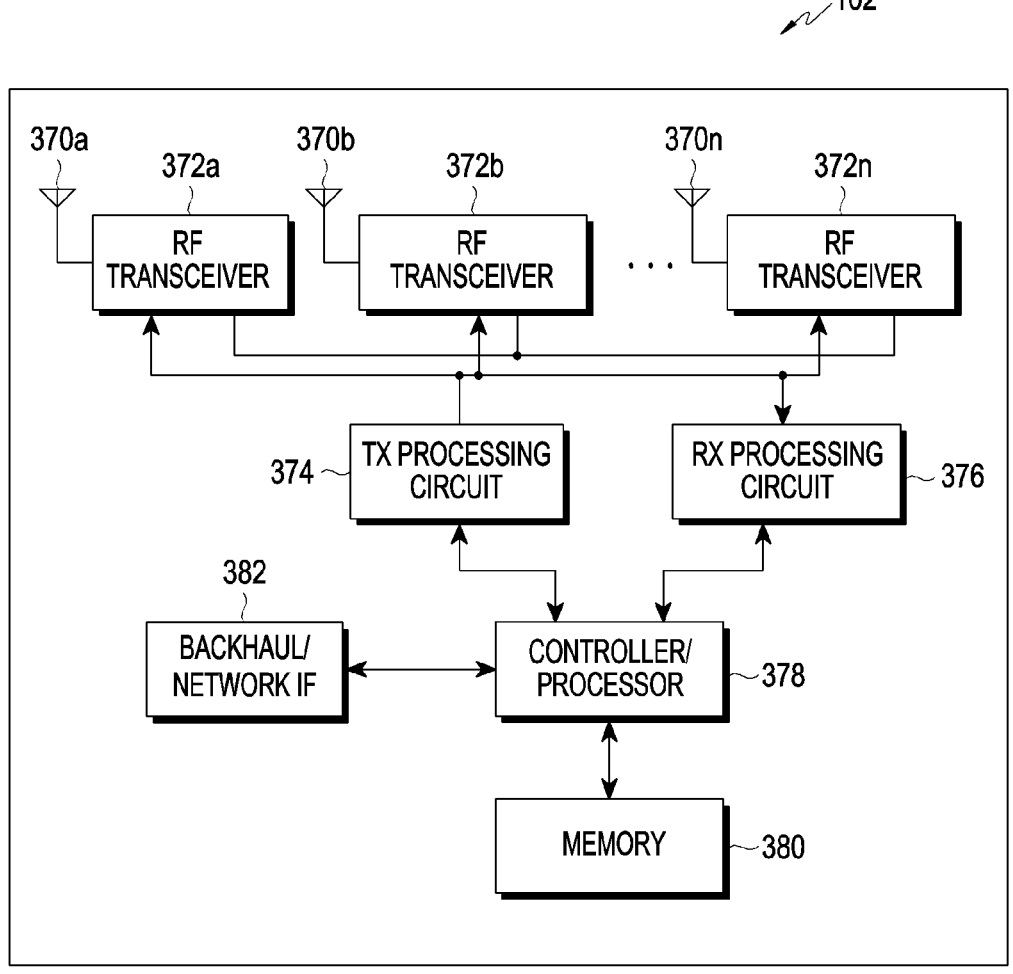
FIG. 3B illustrates a structure of a base station according to embodiments of the present disclosure.

FIG. 3b illustrates an example gNB 102 according to the present disclosure. The embodiment of gNB 102 shown in FIG. 3b is for illustration only, and other gNBs of FIG. 1 can have the same or similar configuration. However, a gNB has various configurations, and FIG. 3b does not limit the scope of the present disclosure to any specific implementation of a gNB. It should be noted that gNB 101 and gNB 103 can include the same or similar structures as gNB 102.

As shown in FIG. 3b, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b illustrates an example of gNB 102, various changes may be made to FIG. 3b. For example, gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

In the prior art, DRX is an effective power-saving method that allows the UE to periodically enter into a sleep mode at certain times and not monitor the PDCCH, and wake up UE from the sleep mode upon the necessity of monitoring, which can achieve the purpose of making UE power saving. Considering the more important power consumption problem of UE, it makes sense to implement DRX when the data transmission delay generated by this method does not affect the user experience.

When the DRX is used for a connected mode, each DRX cycle contains an on duration period (denoted as on duration) and an opportunity for DRX period (denoted as opportunity for DRX), the UE needs to monitor PDCCH during the on duration period, and the UE does not need to monitor PDCCH during the opportunity for DRX period. The UE wakes up to start a DRX-onDurationTimer at the start position of on duration of each DRX, so as to start monitoring PDCCH. However, in practice, the dynamic data service of the UE is hardly completely matched with the DRX cycle configured by a high-level, i.e., the data transmission of the UE may not occur in the on duration period of every DRX cycle, therefore the UE monitoring the PDCCH in the on duration period of each DRX cycle may waste some power consumption.

For at least one of the above technical problems or improvements needed in the related art, the present disclosure provides a user equipment, a base station and methods thereof, and a readable storage medium, considering that if the base station can wake up the UE to start the DRX-onDurationTimer at a specific DRX cycle via the WUS, for example, the base station instructs the UE to start the DRX-onDurationTimer during the DRX cycle with data transmission, and not to start the DRX-onDurationTimer during the DRX cycle without data transmission, the unnecessary PDCCH monitoring can be avoided and the power consumption of the UE can be effectively reduced. Based on this, the scheme gives details about the WUS used to start the DRX-onDurationTimer.

The technical solutions of embodiments of the present disclosure and the technical effects of the technical solutions of the present disclosure will be described below by describing several exemplary embodiments. It should be noted that the following embodiments can be referred to, borrowed from, or combined with each other, and the same terms, similar features, and similar implementation steps in different embodiments will not be described repeatedly.

Figure 4:
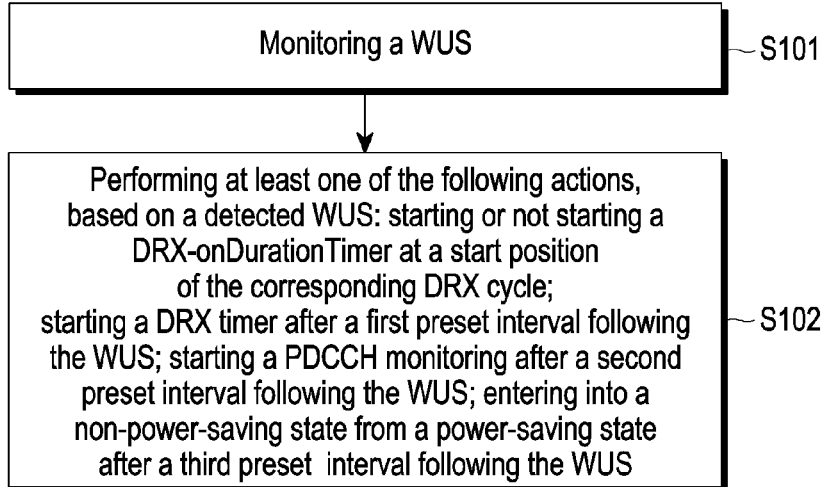
FIG. 4 illustrates a method performed by a UE according to embodiments of the present disclosure.

An embodiment of the present disclosure provides a method performed by a UE, as shown in FIG. 4, the method comprises:

action S101: monitoring the WUS;

action S102: performing at least one of the following actions, based on a detected WUS:

(i) starting or not starting a DRX-onDurationTimer at a start position of the corresponding DRX cycle.

For embodiments of the present disclosure, the UE in RRC connected mode monitors the WUS on the pre-configured resource, the WUS indicates that the UE starts or does not start the DRX-onDurationTimer at the start position of the corresponding DRX cycle, and the UE performs the corresponding operation based on the instruction of the WUS.

In embodiments of the present disclosure, for the purpose of power saving, the WUS may be carried by a physical signal sequence. The UE monitors whether the WUS is transmitted on a pre-configured WUS resource, and if the UE detects the WUS, then the UE starts the DRX-onDurationTimer; or, if the UE detects the WUS, then the UE does not start the DRX-onDurationTimer; or the behavior of the UE after detecting the WUS is pre-configured by the network, e.g., the behavior of the UE after detecting the WUS may be configured to start or not to start the DRX-onDurationTimer.

In embodiments of the present disclosure, the corresponding DRX cycle includes at least one of the followings:

1. a first DRX cycle after the WUS.

That is, in embodiments of the present disclosure, each DRX cycle corresponds to one WUS, that is, the cycle of the WUS is the cycle of the DRX. Optionally, there is a WUS monitoring opportunity before the start position of each DRX cycle (i.e., the start position of DRX-on-Duration), as shown in FIG. 5, and the UE decides whether to start the DRX-onDurationTimer for this DRX cycle based on the result of the WUS monitoring. In other words, the WUS herein is used to indicate that the UE starts or does not start the DRX-onDurationTimer at the start position of the next DRX cycle.

In embodiments of the present disclosure, when the DRX cycle is configured to include two sizes of DRX cycles, wherein the first DRX cycle is larger than the second DRX cycle, i.e., the DRX of the UE is configured with both a long cycle (i.e., the first DRX cycle) and a short cycle (i.e., the second DRX cycle), the DRX cycle of the UE may switch between the long cycle and the short cycle, then the WUS indicates that the UE starts or does not start the DRX-onDurationTimer at the start position of the next long DRX cycle or the next short DRX cycle. That is, the corresponding DRX cycle includes at least one of the followings: (1) the first "first DRX cycle" after the WUS; (2) the first "second DRX cycle" after the WUS. In other words, there can be only long DRX cycle corresponding to one WUS, i.e., there is a WUS monitoring opportunity before the start position of the long DRX cycle, and the UE always starts the DRX-onDurationTimer at the start position of the short DRX cycle; or, there can be only short DRX cycle corresponding to one WUS, i.e., there is a WUS monitoring opportunity before the start position of the short DRX cycle, and the UE always starts the DRX-onDurationTimer at the start position of the long DRX cycle; or, it is possible that each DRX cycle corresponds to one WUS regardless of whether the DRX of the UE is subject to the short cycle or long cycle.

In embodiments of the present disclosure, after any interval of WUS or after WUS refers to after any interval starting from the end position of WUS or after the end position of WUS, but is not limited to this. Similar contents will not be repeated in the following.

2. $N_1$ consecutive DRX cycles after the WUS, wherein $N_1$ is a positive integer, and $N_1$ is predefined or pre-configured.

Wherein, the pre-configured may refer to configured by the base station, but is not limited to this. Similar contents will not be repeated in the following.

That is, in embodiments of the present disclosure, $N_1$ consecutive DRX cycles correspond to one WUS, i.e., the cycle of the WUS is $N_1$ times the cycle of DRX, and the size of $N_1$ can be pre-configured by the network. For example, there is a WUS monitoring opportunity before the start position of the first DRX cycle (i.e., the start position of DRX-on-Duration) in every $N_1$ DRX cycles, and the UE decides whether to start the DRX-onDurationTimer for the next consecutive $N_1$ cycles based on the WUS monitoring result, i.e., the UE either starts the DRX-onDurationTimer for all the $N_1$ consecutive DRX cycles or does not start the DRX-onDurationTimer for the $N_1$ consecutive DRX cycles. In other words, the WUS herein is used to indicate that the UE starts or does not start the DRX-onDurationTimer at the start position of the next consecutive DRX cycles. As an example of $N_1$=2, as shown in FIG. 6, the WUS indicates that the UE starts or does not start the DRX-onDuration-Timer at the start position of the next two consecutive DRX cycles.

In embodiments of the present disclosure, when the DRX of the UE is configured with both long cycle (i.e., the first DRX cycle) and short cycle (i.e., the second DRX cycle), the DRX cycle of the UE may switch between the long cycle and the short cycle, the DRX cycle of UE includes at least one of the followings: (1) the first "first DRX cycle" after the WUS; (2) the $N_1$ consecutive second DRX cycles after WUS. That is, each $N_1$ short DRX cycles correspond to one WUS and each long DRX cycle corresponds to one WUS, i.e., $N_1$ is only used for short DRX cycle, but is not limited to this. For embodiments of the present disclosure, the parameter DRX-ShortCycleTimer for controlling the DRX of the UE to switch between the long cycle and the short cycle may be configured to be divisible by $N_1$.

In embodiments of the present disclosure, during active time of DRX, the UE does not need to monitor the WUS. That is, it can be that only the UE in non-active time of DRX monitors the WUS, if the UE is in active time of DRX at the transmission time of the WUS, then the UE does not need to monitor the WUS. This is because during active time of DRX, the base station can let the UE continuously monitor the PDCCH by scheduling, there is no need to instruct the UE to start the DRX-onDurationTimer through the WUS.

(ii) starting a DRX timer after a first preset interval following the WUS, wherein the UE monitors the PDCCH during the operation of the DRX timer;

For embodiments of the present disclosure, the UE in RRC connected mode monitors the WUS on the pre-configured resource, the WUS indicates that the UE starts a DRX timer at the position of the first preset interval after the WUS. This DRX timer is used to control the PDCCH monitoring of the UE for a continuous period of time, and the UE performs the corresponding operation based on the instruction of the WUS, i.e., if the UE detects the WUS, then the UE starts one DRX timer at the position of the first preset interval after the WUS.

In embodiments of the present disclosure, there is no correlation between the cycle of WUS and the cycle of DRX, and the cycle of the WUS can be configured independently, for example, the cycle of WUS can be configured to be smaller than the cycle of DRX or larger than the cycle of DRX.

Figure 7:
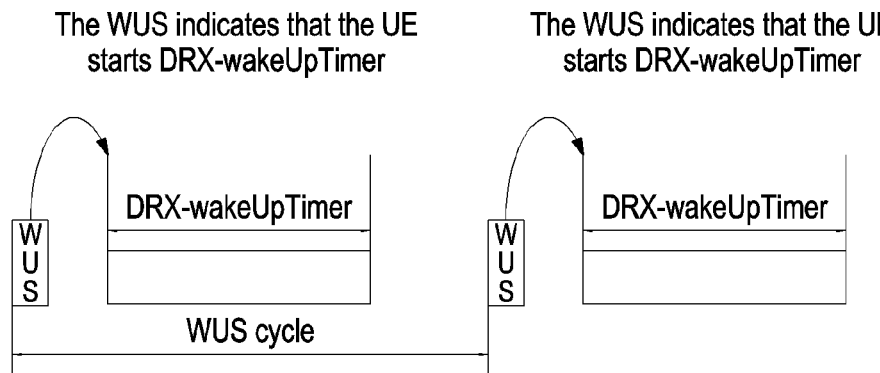
FIG. 7 illustrates a WUS indicating starting a DRX timer according to embodiments of the present disclosure.

Optionally, the DRX timer in embodiments of the present disclosure is a newly defined DRX timer, and in order to distinguish from the existing DRX timers, the newly defined DRX timer may be referred to as DRX-wakeUpTimer. The DRX-wakeUpTimer may be similar to the existing DRX-onDurationTimer or DRX-inactivityTimer. In other words, the WUS is used to indicate that the UE starts the DRX-wakeUpTimer to start a period of PDCCH monitoring, as shown in FIG. 7.

Similarly, in embodiments of the present disclosure, the UE does not need to monitor the WUS during the active time of DRX. That is, it can be that only the UE in the non-active time of DRX monitors the WUS, i.e., the UE starts the DRX-wakeUpTimer during the non-active time of the DRX cycle. If the UE at the transmission time of WUS is in the active time of DRX, the base station does not need to instruct the UE to start the DRX-wakeUpTimer via the WUS.

(iii) starting the PDCCH monitoring after a second preset interval following the WUS.

For embodiments of the present disclosure, the UE in RRC connected mode monitors the WUS on the pre-configured resource, the WUS indicates that the UE starts the PDCCH monitoring at the position of the second preset interval after the WUS, or the WUS indicates that the UE starts the PDCCH monitoring at the position of the second preset interval after the WUS and the PDCCH monitoring continues for a period of time of a preconfigured length. The UE performs the corresponding operation based on the indication of WUS, i.e., if the UE detects the WUS, then the UE starts the PDCCH monitoring at the position of the second preset interval after WUS.

Optionally, the WUS indicates that the PDCCH monitoring started by the UE is based on a PDCCH time slot determined according to the PDCCH search space pre-configured by the high-level signaling, i.e., the PDCCH time slot monitored by the UE is pre-configured, and the UE monitors the PDCCH only on the pre-configured PDCCH time slot and does not need to monitor the PDCCH on other time slots. Optionally, the WUS indicates that the PDCCH monitoring started by the UE is continuously monitoring the PDCCH on each time slot for a period of time of the preconfigured length, i.e., the PDCCH time slots monitored by the UE are a continuous set of time slots starting at the position of the second preset interval after the WUS, which means that the PDCCH time slot monitored by the UE is dynamically determined through the WUS. In addition to the PDCCH time slots dynamically determined based on WUS, the other parameters of PDCCH monitoring can reuse a particular PDCCH search space.

In embodiments of the present disclosure, there is no correlation between the cycle of WUS and the cycle of DRX, and the cycle of the WUS can be configured independently, for example, the cycle of WUS can be configured to be smaller than the cycle of DRX or larger than the cycle of DRX.

Similarly, in embodiments of the present disclosure, the UE does not need to monitor the WUS during the active time of DRX. That is, it can be that only the UE in the non-active time of DRX monitors the WUS. If the UE at the transmission time of WUS is in the active time of DRX, the base station does not need to instruct the UE to start a period of PDCCH monitoring via the WUS.

(iv) entering into a non-power-saving state from a power-saving state after a third preset interval following the WUS, wherein the UE does not transmit and receive signals and/or channels other than the WUS in the power-saving state, and the UE is able to transmit and receive signals and/or channels in the non-power-saving state.

Wherein, the name of the power-saving state or non-power-saving state is not to be construed as a limitation of these states, and in practice, these states are not limited to these names, but may also be with other names, such as a first state, a second state, etc.

For embodiments of the present disclosure, the UE in RRC connected mode monitors the WUS on the pre-configured resource, the WUS indicates that the UE exits a power-saving state and enters into a non-power-saving state at the position of the third preset interval after the WUS, and the power-saving state is a newly defined state. The UE may be configured not to receive downlink channels or signals other than the WUS in this power-saving state, and not to transmit any uplink channel or signal, unless uplink data arrives. The UE may receive downlink channels or signals other than the WUS or transmit uplink channels or signals in this non-power-saving state.

Figure 8:
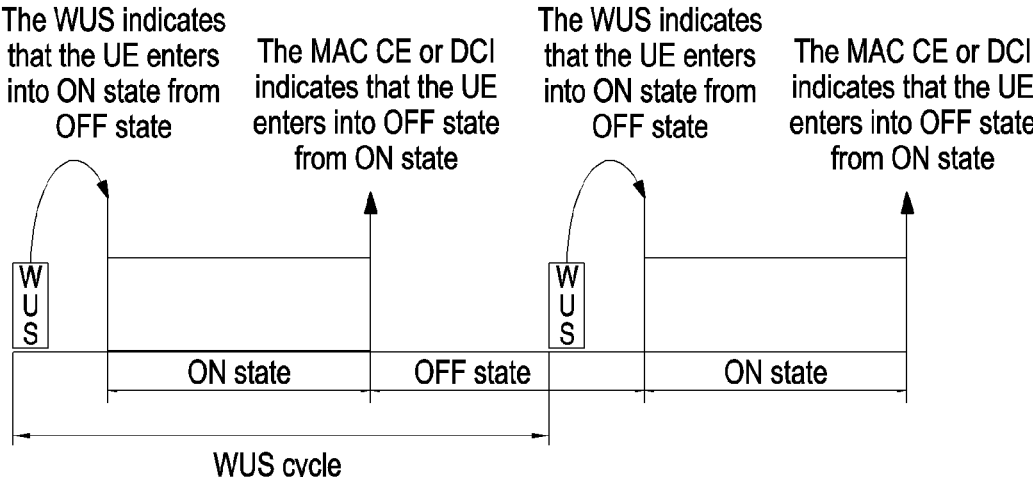
FIG. 8 illustrates a WUS indicating entering into a power-saving state according to embodiments of the present disclosure.

This power-saving state may be called as OFF state, and a state corresponding to the OFF state may be called an ON state (i.e., non-power-saving state), and the behavior of UE in the ON state is the same as that in the existing system. If the UE is configured with the DRX, the UE needs to be subject to a DRX mechanism in the ON state, and the base station can indicate that the UE enters into the OFF state from the ON state via medium access control (MAC) control element (CE) or downlink control information (DCI), and the UE enters into the power-saving state from the non-power-saving state based on the indication of received MAC CE or DCI. Wherein, the WUS may be periodic and the UE monitors the WUS only in the OFF state, i.e., the UE does not need to monitor WUS in the non-power-saving state, as shown in FIG. 8.

The UE performs at least one of the following actions in the OFF state:

1. stopping all DRX timers, which also means that the UE needs to stop the PDCCH monitoring;
2. not starting DRX-onDurationTimer at the start position of the DRX cycle;
3. the UE not desiring to receive channel state information-reference signal (CSI-RS) to perform the measurement;
4. the UE not desiring to receive SSB to perform the measurement; and
5. the UE not desiring to receive semi-persistent scheduling (SPS) physical downlink shared channel (PDSCH).

In embodiments of the present disclosure, when the WUS indicates that the UE enters into a non-power-saving state from a power-saving state, i.e., when the WUS indicates that the UE enters into the ON state from the OFF state, a first activated downlink BWP or uplink BWP comprises at least one of the followings:

1. a pre-configured first activated BWP, such as a BWP configured by the existing high-level parameters firstActiveDownlinkBWP-Id and firstActiveUplinkBWP-Id;
2. an initial BWP, which may be pre-configured, such as a BWP configured by the existing high-level parameters initialDownlinkBWP and initialUplinkBWP;
3. a default BWP, which may be pre-configured, such as a BWP configured by the existing high-level parameter defaultDownlinkBWP-Id;
4. a dormant BWP, which may be pre-configured, such as a BWP configured by the existing high-level parameter dormantBWP-Id; or
5. a BWP that is activated for the first time by entering into the non-power-saving state, i.e., a BWP that is activated for the first time by entering into the ON state, which can be a newly defined BWP, and can be pre-configured, e.g., a BWP configured by the newly defined high-level parameters firstActiveDownlinkBWPforON-Id and firstActiveUplinkBWPforON-Id.

In embodiments of the present disclosure, the UE may have two receivers, a primary connection receiver (PCR) for receiving all signals and/or channels other than the WUS, and a wake up receiver (WUR) for receiving the WUS only. Wherein, the names of the receivers are not to be construed as limiting these functions, which in practice are not limited to these names, but can also be other names, such as a first receiver, a second receiver, etc. For embodiments of the present disclosure, the previous OFF state can also be called a PCR-OFF state, and the ON state can also be called a PCR-ON state.

The PCR-OFF state means that the PCR is turned off, i.e., the power-saving state above is a state that the PCR is turned off. During this period, the UE does not receive any signal/channel other than the WUS, including reference signals such as SSB, CSI-RS, etc. for measurement and/or synchronization, i.e., the UE does not need to perform any measurement and synchronization tracking during the period that the PCR is turned off, including measurement for radio resource management (RRM), measurement for radio link monitoring (RLM), measurement for beam failure detection (BFD), measurement for channel state information (CSI), etc., and the UE does not monitor the PDCCH. During this period, the UE monitor the WUS specifically via the WUR, i.e., the UE only monitors the WUS periodically with a very low power via the WUR.

The PCR-ON state means that the PCR is turned on, i.e., the non-power-saving state is a state that the PCR is turned on. During this period, the UE does not need to monitor the WUS, and the PCR can receive all signals/channels other than the WUS normally, including SSB, CSI-RS, etc. for measurement, as well as can monitor PDCCH, etc.

In embodiments of the present disclosure, the WUS is used to indicate that the UE switches from the PCR-OFF state to the PCR-ON state, i.e., the process of entering into a non-power-saving state from the power-saving state specifically includes starting the PCR.

The method performed by the UE provided in embodiments of the present disclosure wakes up the UE for PDCCH monitoring at a specific time by WUS, thus avoiding unnecessary PDCCH monitoring, which can effectively reduce the power consumption of the UE.

In embodiments of the present disclosure, the time domain position of the WUS can be determined based on a reference position and a time domain offset with respect to the reference position; wherein the reference position includes at least one of the followings: a start position of the corresponding DRX cycle; a reference SSB.

That is, in embodiments of the present disclosure, the time domain position of the WUS may be indicated by the time domain offset of the WUS with respect to the reference position, i.e., the UE determines the time domain position of the WUS based on the reference position and the corresponding time domain offset indicated by the network. Wherein, the time domain offset is the distance between the start position of the WUS and the start position of the reference point. Optionally, the time domain position of the WUS is indicated by the time domain offset of the WUS with respect to the start position of the DRX cycle (i.e., the start position of the DRX-onDuration), or the time domain position of the WUS is indicated by the time domain offset of the WUS with respect to the reference SSB (the start position of the reference SSB).

In embodiments of the present disclosure, an indicative granularity of the time domain offset (i.e., the offset between the WUS and the reference position) includes at least one of a wireless frame, a time slot, or a symbol, for example, the indicative granularity may be a wireless frame, or a time slot, or a symbol.

Wherein, in the case of the granularity being a wireless frame, the time domain offset is defined as: when the indicative granularity of the time domain offset is a wireless frame, the time domain offset is an offset of the wireless frame in which the WUS is located with respect to the wireless frame in which the reference position is located. Wherein, the time domain position of the WUS is also determined based on the WUS position information within the wireless frame indicated by the base station, i.e., the UE determines the position of the wireless frame in which the WUS is located based on the time domain offset indicated by the base station, and then determines the specific time domain position of the WUS based on the WUS position information within the wireless frame indicated by the base station.

Wherein, in the case of the granularity being a time slot, the time domain offset is defined as: when the indicative granularity of the time domain offset is a time slot, the time domain offset is an offset of the time slot in which the WUS is located with respect to the time slot in which the reference position is located. Wherein, the time domain position of the WUS is also determined based on the WUS position information within the time slot indicated by the base station, i.e., the UE determines the position of the time slot in which the WUS is located based on the time domain offset indicated by the base station, and then determines the specific time domain location of the WUS based on the WUS location information within the time slot indicated by the base station.

Wherein, in the case of the granularity being a symbol, the time domain offset is defined as: when the granularity of the time domain offset is a symbol, the time domain offset is the offset of the start symbol of the WUS with respect to the start symbol in which the reference position is located.

Figure 9:
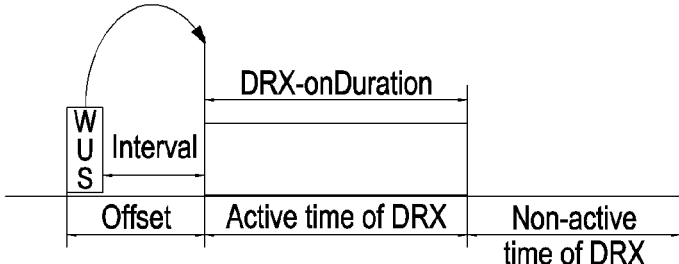
FIG. 9 illustrates a diagram I of determining a time domain position of a WUS according to embodiments of the present disclosure.

Specifically, for the above-mentioned WUS used to indicate whether the UE starts or does not start the DRX-onDurationTimer, the time domain position of the WUS can be indicated by the time domain offset of the WUS with respect to the start position of the DRX cycle (i.e., the start position of the DRX-onDuration). Optionally, the WUS is before the DRX-onDuration, as shown in FIG. 9.

In embodiments of the present disclosure, the interval between the time domain position of the WUS and the reference position (i.e., the start position of the corresponding DRX cycle) is not less than a predetermined interval, where the predetermined interval is a predefined minimum interval, or a minimum interval reported by the UE. For example, in FIG. 9, the interval between WUS and DRX-onDuration satisfies the minimum interval requirement, the so-called interval is the distance between the end position of WUS and the start position of DRX-onDuration, the reason for reserving the interval between the WUS and the DRX-onDuration is that the UE detecting WUS and preparing for the initiation of DRX-onDurationTimer require a certain processing time. In practice, the UEs with different capabilities can support different sizes of minimum intervals between the WUS and the DRX-onDuration, and the system can define at least two minimum intervals for UE capabilities, and UEs can report their supported minimum interval capabilities to the network, and the WUS configured for UE by the base station needs to be able to meet minimum intervals reported by the UE.

In embodiments of the present disclosure, the reference SSB may also refer to a reference SSB set. The time domain position of the WUS can be indicated by the time domain offset of the WUS with respect to the start position of the reference SSB set. Optionally, the WUS is before the reference SSB set.

For example, for the WUS described above for instructing the UE to start or not to start the DRX-onDurationTimer, the reference position may be a first SSB set that satisfies a predetermined interval before the DRX-onDuration.

In embodiments of the present disclosure, the interval between the time domain position of the WUS and the reference position (i.e., the reference SSB) is not less than a predetermined interval, wherein the predetermined interval is a predefined minimum interval, or a minimum interval reported by the UE. For example, as shown in FIG. 10, the interval between the WUS and the reference SSB (set) satisfies the minimum interval requirement, and the interval between the WUS and the reference SSB is the distance between the end position of the WUS and the start position of the reference SSB (set), and the reason for reserving the interval between the WUS and the reference SSB (set) is that the UE detecting the WUS and preparing for receiving the SSB to regain downlink synchronization require a certain processing time.

Figure 10:
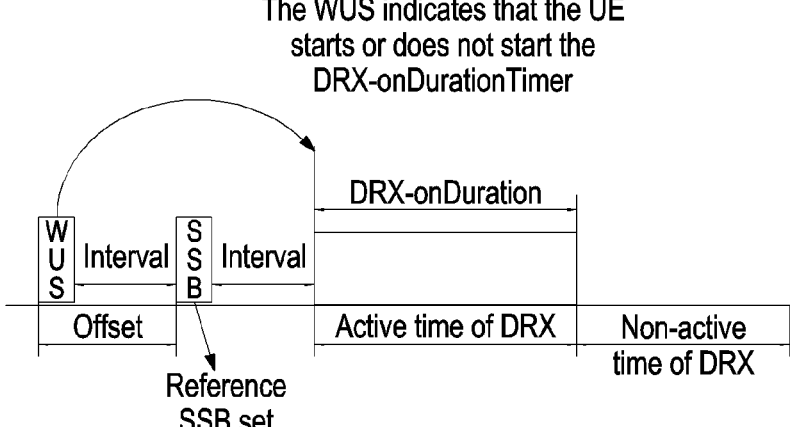
FIG. 10 illustrates a diagram II of determining a time domain position of a WUS according to embodiments of the present disclosure.

Further, continuing as shown in FIG. 10, the interval between the reference SSB set and the DRX-onDuration also satisfies the minimum interval requirement, i.e., the interval between the reference SSB set and the DRX-onDuration is also not less than the predetermined interval, and the predetermined interval can also be the predefined minimum interval, or the minimum interval reported by the UE. The interval between the reference SSB set and the DRX-onDuration is the distance between the end position of the reference SSB (set) and the start position of the DRX-onDuration. The reason why the reference SSB (set) needs to meet the position of the predetermined interval before DRX-onDuration is that the UE needs to receive the SSB to regain downlink synchronization after detecting the WUS, and the UE needs some processing time to obtain downlink synchronization based on the SSB and to prepare for starting DRX-onDurationTimer.

After obtaining downlink synchronization, and then starting the DRX-onDurationTimer, monitoring the PDCCH may be performed. In practice, the UEs with different capabilities can support different sizes of minimum intervals between the reference SSB and the DRX-onDuration and between the WUS and the reference SSB, and the system can define at least two minimum intervals for UE capability. The UE may report the supported minimum interval capability thereof to the network, and the UE determines the time domain position of the reference SSB based on the reported minimum interval and thus the time domain position of the WUS.

In embodiments of the present disclosure, the reference SSB comprises at least one of the followings:

1. a first SSB (set) with an interval not less than a predetermined interval before the corresponding DRX cycle.

For example, for the above-mentioned WUS used to indicate the UE to start or not to start the DRX-onDuration-Timer, the reference SSB may be the first SSB (set) that satisfies a predetermined interval before the DRX-onDuration.

2. an $N_2$th SSB (set) with an interval not less than a predetermined interval before the corresponding DRX cycle.

Since the number of SSB required to be received by the UEs with different capabilities to obtain downlink synchronization varies, the reference SSB may also be the $N_2$th SSB (set) that satisfies the predetermined interval before DRX-onDuration, wherein Na is a positive integer and Na is at least one of the predefined, pre-configured, minimum Na value reported by the UE.

3. a first SSB among the $N_3$ consecutive SSBs, wherein $N_3$ is a positive integer, and $N_3$ is at least one of the predefined, pre-configured, $N_3$ value determined based on the ratio of the WUS cycle to the SSB cycle.

Figure 11:
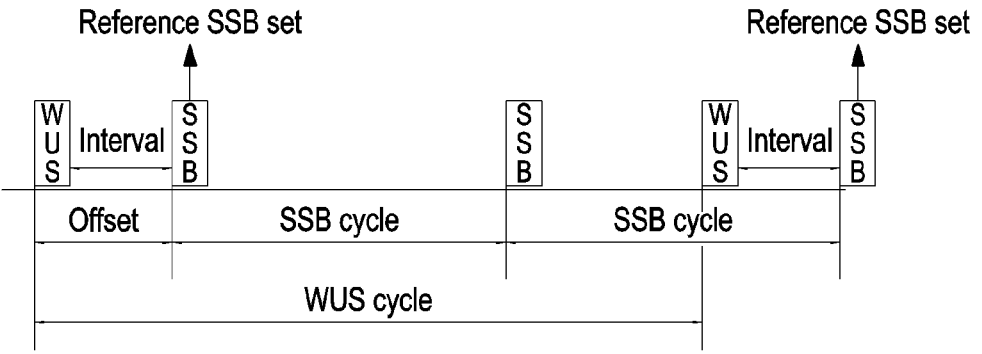
FIG. 11 illustrates a diagram III of determining a time domain position of a WUS according to embodiments of the present disclosure.

For example, for the above-mentioned WUS for instructing the initiation of the DRX-wakeUpTimer and the WUS for instructing the entry into the ON state, the reference SSB may be determined based on a mapping rule (e.g., a ratio) between the WUS cycle and the SSB cycle. The cycle of the WUS may be configured by UE-specific RRC signaling and the cycle of the WUS may be able to be divisible by the cycle of the SSB. For example, if $N_{3=2}$, as shown in FIG. 11, one WUS cycle and two SSB cycles are equal in size.

For embodiments of the present disclosure, the interval between the time domain position of the WUS and the reference position (i.e., the reference SSB) is not less than a predetermined interval, wherein the predetermined interval is the predefined minimum interval, or the minimum interval reported by the UE. That is, the interval between the WUS and the reference SSB (set) may meet the minimum interval requirement, and the so-called interval refers to the distance between the end position of the WUS and the start position of the reference SSB (set).

The reason for reserving the interval between the WUS and the reference SSB (set) is that the UE detecting WUS and preparing for the reception of the reference SSB (set) require a certain processing time. The UEs with different capabilities can support different sizes of minimum intervals between the WUS and the reference SSB (set), and the system can define at least two minimum intervals for UE capabilities, and the UE may report the supported minimum interval capability thereof to the network, and the WUS configured for the UE by the base station may meet minimum interval reported by the UE.

In embodiments of the present disclosure, the WUS has only one monitoring opportunity in each cycle, i.e., there is only one WUS resource in each cycle, and the time domain position of this WUS resource can be indicated by the above-mentioned time domain offset with respect to the reference position, and the advantage of only one WUS resource per cycle is a small resource overhead.

In embodiments of the present disclosure, in order to improve the scheduling flexibility of the base station and avoid that the WUS on the unique resource may be missed by the UE, resulting in information asymmetry between the base station and the UE, the WUS may have multiple monitoring opportunities in each cycle. For example, there can be multiple WUS resources within a time window of each cycle. In other words, the WUS has a monitoring window in each cycle, the WUS monitoring window contains at least one WUS resource, the UE monitors the WUS on at least one WUS resource in the WUS monitoring window, and once the WUS is detected, the subsequent WUS resources do not need to be monitored.

In embodiments of the present disclosure, the time domain location of the WUS monitoring window is determined based on at least one of the followings:

1. The start position of the WUS monitoring window is determined based on a reference position and a time domain offset with respect to the reference position.

That is, the start position of the WUS monitoring window can be indicated by the above time domain offset with respect to the reference position, and the reference position can include at least one of the start position of DRX-onDuration, the start position of the reference SSB, and the specific determination can be referred to the introduction above, which will not be repeated here.

2. the start position of the WUS monitoring window is determined based on the end position of the WUS monitoring window, and the length of the WUS monitoring window:

wherein, the length of the WUS monitoring window is predefined or pre-configured; and wherein, the end position of the WUS monitoring window may be determined based on a reference position and a minimum interval (i.e., a minimum interval between the WUS and the reference position) reported by the UE with respect to the reference position, and the reference position may include at least one of the start position of the DRX-onDuration, and the start position of the reference SSB. For example, the end position of the WUS monitoring window is determined by the minimum interval between the WUS and the start position of the DRX cycle, reported by the UE, or is determined by the minimum interval between the WUS and the reference SSB set, reported by the UE.

Alternatively, the end position of the WUS monitoring window is determined based on the reference position and the time domain offset with respect to the reference position, and the reference position may include at least one of the start position of the DRX-onDuration, the start position of the reference SSB, and the specific determination can be referred to the introduction above, which will not be repeated here.

Wherein, the length of the WUS monitoring window may be pre-configured or predefined by the network. Then, the start position of the WUS monitoring window can be determined based on the end position of the WUS monitoring window and the length of the WUS monitoring window.

3. the end position of the WUS monitoring window is determined based on the reference position and the time domain offset with respect to the reference position.

That is, the end position of the WUS monitoring window can be indicated by the above time-domain offset with respect to the reference position, and the reference position can include at least one of the start position of DRX-onDuration and the start position of the reference SSB, and the specific determination can be referred to the introduction above, which will not be repeated here.

4. the end position of the WUS monitoring window is determined based on the start position of the WUS monitoring window, and the length of the WUS monitoring window:

wherein, the length of the WUS monitoring window is predefined or pre-configured;

wherein, the start position of the WUS monitoring window is determined based on a reference position and a time domain offset with respect to the reference position, and the reference position may include at least one of the start position of the DRX-onDuration, and the start position of the reference SSB, and the specific determination can be referred to the introduction above, which will not be repeated here; and wherein, the length of the WUS monitoring window may be pre-configured or predefined by the network. Then, according to the start position of the WUS monitoring window and the length of the WUS monitoring window, the end position of the WUS monitoring window can be determined.

5. The end position of the WUS monitoring window is determined based on the reference position and the minimum interval reported by the UE with respect to the reference position:

wherein, the reference position may include at least one of the start position of the DRX-onDuration, and the start position of the reference SSB. For example, the end position of the WUS monitoring window is determined by the minimum interval between the WUS and the start position of the DRX period, reported by the UE, or is determined by the minimum interval between the WUS and the reference SSB set, reported by the UE.

In embodiments of the present disclosure, the indicative granularity of the time domain offset (i.e., the offset between the WUS and the reference position) includes at least one of the wireless frame, time slot, and symbol. Wherein, when the indicative granularity of the time domain offset is a wireless frame, the time domain offset is an offset of the wireless frame in which the start position or the end position of the WUS monitoring window is located with respect to the wireless frame in which the reference position is located. Wherein, the start position or the end position of the WUS monitoring window is also determined based on the WUS position information within the wireless frame indicated by the base station, i.e., the UE determines the position of the wireless frame in which the start position or the end position of the WUS monitoring window is located based on the time domain offset indicated by the base station, and then determines the specific time domain position of the start position or the end position of the WUS monitoring window based on the WUS position information within the wireless frame indicated by the base station.

Wherein, when the indicative granularity of the time domain offset is a time slot, the time domain offset is an offset of the time slot in which the start position or the end position of the WUS monitoring window is located with respect to the time slot in which the reference position is located. Wherein, the start position or the end position of the WUS monitoring window is also determined based on the WUS position information within the time slot indicated by the base station, i.e., the UE determines the position of the time slot in which the start position or the end position of the WUS monitoring window is located based on the time domain offset indicated by the base station, and then determines the specific time domain location of the start position or the end position of the WUS monitoring window based on the WUS location information within the time slot indicated by the base station. Wherein, when the granularity of the time domain offset is a symbol, the time domain offset is the offset of the start symbol or end symbol of the WUS monitoring window with respect to the start symbol in which the reference position is located.

In embodiments of the present disclosure, the interval between the end position of the WUS monitoring window and the reference position is not less than a predetermined interval; wherein the predetermined interval is a predefined minimum interval, or a minimum interval reported by the UE. For example, the interval between the end position of the WUS monitoring window and the DRX-onDuration satisfies the minimum interval requirement, which is the distance between the end position of the WUS monitoring window and the start position of the DRX-onDuration. For another example, the interval between the end position of the WUS monitoring window and the reference SSB (set) satisfies the minimum interval requirement, which is the distance between the end position of the WUS monitoring window and the start position of the reference SSB (set). For this case, the interval between the reference SSB set and DRX-onDuration also satisfies the minimum interval requirement. The specific implementation of this disclosure embodiment can be found in the introduction above and will not be repeated here.

In embodiments of the present disclosure, the reference SSB comprises at least one of the followings:

1. A first SSB (set) with an interval not less than a predetermined interval before the corresponding DRX cycle.

For example, for the above-mentioned WUS used to indicate the UE to start or not to start the DRX-onDuration-Timer, the reference SSB may be the first SSB (set) that satisfies a predetermined interval before the DRX-onDuration.

2. An $N_2$th SSB (set) with an interval not less than a predetermined interval before the corresponding DRX cycle.

Since the number of SSB required to be received by the UEs with different capabilities to obtain downlink synchronization varies, the reference SSB may also be the $N_2$th SSB (set) that satisfies the predetermined interval before DRX-onDuration, wherein Na is a positive integer and Na is at least one of the predefined, pre-configured, minimum Na value reported by the UE.

3. A first SSB among the $N_3$ consecutive SSBs, wherein $N_3$ is a positive integer, and $N_3$ is at least one of the predefined, pre-configured, $N_3$ value determined based on the ratio of the WUS cycle to the SSB cycle.

For example, for the above-mentioned WUS for instructing the initiation of the DRX-wakeUpTimer and the WUS for instructing the entry into the ON state, the reference SSB may be determined based on a mapping rule (e.g., a ratio) between the WUS cycle and the SSB cycle. The cycle of the WUS may be configured by UE-specific RRC signaling and the cycle of the WUS may be able to be divisible by the cycle of the SSB. That is, the cycle of the WUS can be an integer multiple of the cycle of the SSB, and each $N_3$ SSBs correspond to one WUS.

In embodiments of the present disclosure, the time domain position of at least one WUS resource within the WUS monitoring window is determined based on at least one of the followings:

1. The time domain interval information between two adjacent WUS resources indicated by the base station, wherein, the start position of the WUS monitoring window is the start position of the first WUS resource.

That is, in embodiments of the present disclosure, the WUS resources within the WUS monitoring window can be equally spaced distributed, i.e., the WUS resources have periodicity within the monitoring window, and the distance between two adjacent WUS resources (i.e., the relative offset, which can be the interval from the start position of one WUS to the start position of the next WUS, or the end position of one WUS to the start position of the next WUS position) can be pre-configured by the network, the start position of the WUS monitoring window is the start position of the first WUS resource, and the time domain position of the remaining WUS resources can be determined according to the start position of the WUS monitoring window and the distance between two adjacent WUS resources.

2. The bitmap information indicated by the base station, wherein, the bitmap information is used to indicate whether there are WUS resources on each time unit within the WUS monitoring window, and wherein, the time unit can be time slot and/or symbol.

That is, in embodiments of the present disclosure, the WUS resource within the WUS monitoring window may be pre-configured. Specifically, the bitmap information indicates the position of the time slot or symbol in which the WUS resource is located in the monitoring window, and the number of bits in the bitmap is the total number of time slots or symbols in the WUS monitoring window, and each bit of the bitmap can correspond to one time slot or one symbol, and the indication value "1" indicates that there is WUS resource on the corresponding time slot or symbol, and the indication value "0" indicates that there is no WUS resource on the corresponding time slot or symbol.

In embodiments of the present disclosure, the process of starting the DRX timer after a first preset interval following the WUS specifically includes: starting the DRX timer after a first preset interval starting from the end position of the WUS monitoring window. That is, for the above-mentioned WUS used to indicate starting the DRX-wakeUpTimer, the time when the UE starts the DRX-wakeUpTimer is the position of the first preset interval after the end position of the WUS monitoring window.

The process of starting the PDCCH monitoring after the second preset interval following the WUS specifically includes: starting the PDCCH monitoring after the second preset interval starting from the end position of the WUS monitoring window. That is, for the above-mentioned WUS used to indicate starting the PDCCH monitoring, the time when the UE starts the PDCCH monitoring is the position of the second preset interval after the end position of the WUS monitoring window.

The process of entering into the non-power-saving state from the power-saving state after the third preset interval following the WUS specifically comprises: entering into the non-power-saving state from the power-saving state after the third preset interval starting from the end position of the WUS monitoring window. That is, for the WUS indicated above to enter into the ON state, the time when the UE enters into the ON state is the position of the third preset interval after the end position of the WUS monitoring window.

In embodiments of the present disclosure, the WUS is carried by a physical signal sequence. That is, in order to reduce the complexity and power consumption of the UE detecting the WUS, the WUS can be carried by a physical signal sequence, and the signal sequence carrying the WUS can be called a WUS signal sequence.

Specifically, the WUS signal sequence is configured to carry at least one of the following status information: an indication that the UE starts the DRX-onDurationTimer at the start position of the corresponding DRX cycle; an indication that the UE does not start DRX-onDurationTimer at the start position of the corresponding DRX cycle.

Further, carrying by the physical signal sequence may specifically comprise at least one of the followings:

1. carrying, by a WUS signal sequence, status information for instructing that the UE starts the DRX-onDurationTimer at the start position of the corresponding DRX cycle. That is, instructing one status information by a WUS signal sequence, the base station may transmit or not transmit this WUS signal sequence, and if the UE detects this WUS signal sequence, the UE starts the DRX-onDurationTimer.

2. carrying, by a WUS signal sequence, status information for instructing that the UE does not start the DRX-onDurationTimer at the start position of the corresponding DRX cycle. That is, one WUS signal sequence is used to indicate one status information, the base station can transmit or not transmit this WUS signal sequence, and if the UE detects this WUS signal sequence, the UE does not start the DRX-onDurationTimer.

3. carrying, by a first WUS signal sequence, status information for instructing that the UE starts the DRX-onDurationTimer at the start position of the corresponding DRX cycle, and carrying, by a second WUS signal sequence, status information for instructing that the UE does not start the DRX-onDurationTimer at the start position of the corresponding DRX cycle. That is, the two WUS signal sequences are used to indicate two status information (can be one bit information), instructing starting the DRX-onDurationTimer and not starting DRX-onDurationTimer, respectively. The base station transmits one of two WUS signal sequences. The UE performs the corresponding operation upon detecting either of the WUS signal sequences.

In embodiments of the present disclosure, the WUS signal sequence can be an M sequence or a Gold sequence, for example, a signal sequence similar to the PSS/SSS of the NR system. The generated WUS signal sequence is mapped to the frequency domain subcarriers of OFDM symbols after binary phase shift keying (BPSK) or on-off keying (OOK) modulation. In order to reduce the reception bandwidth of WUS while ensuring good detection performance, a long WUS sequence can be mapped to multiple consecutive symbols, and on each symbol, the WUS can occupy the same or different numbers of subcarriers, and the mapping order can be frequency domain first and then time domain.

In addition, in order to improve the inter-cell anti-interference performance and intra-cell anti-interference performance of the WUS signal, the WUS sequence can be scrambled, for example, by performing a bit-level or resource element RE-level scrambling process, and the scrambled sequence and/or the WUS sequence can be generated based on at least one of the following parameters, i.e., the WUS signal sequence is generated and/or scrambled based on at least one of the following parameters:

1. a physical cell identity document (ID);
2. a cell-radio network temporary identity (C-RNTI) of the UE;
3. an index number of the system frame in which the start position of the DRX cycle associated with the WUS is located;
4. an index number of the time slot in which the start position of the DRX cycle associated with the WUS is located;
5. an index number of the symbol in which the start position of the DRX cycle associated with the WUS is located;
6. an index number of the system frame in which the start position of the reference SSB (set) associated with the WUS is located;
7. an index number of the time slot in which the start position of the reference SSB (set) associated with the WUS is located;
8. an index number of the symbol in which the start position of the reference SSB (set) associated with the WUS is located;
9. an index number of the system frame in which the start position of the WUS is located;
10. an index number of the time slot in which the start position of the WUS is located; and
11. an index number of the symbol in which the start position of the WUS is located.

In embodiments of the present disclosure, the advantage of using the above parameters to generate the WUS signal sequence or scrambled sequence is that the anti-interference performance of the WUS signal sequence can be improved, including the inter-cell anti-interference performance and intra-cell anti-interference performance.

In embodiments of the present disclosure, considering that the reception bandwidth of the UE affects the power consumption, the RF bandwidth used to receive the WUS can be smaller than the minimum bandwidth supported by the current 5G NR system for further power-saving, i.e., the reception bandwidth of the WUS can be smaller than the minimum reception bandwidth supported by the current UE, for example, for non-reduced capability (Red-Cap) NR UE, the minimum reception bandwidth of UE is 20 MHz, the reception bandwidth of WUS can be as small as 5 MHz.

To allow the UE to receive the WUS in low power consumption, the WUS can be carried by a physical signal sequence. For simplicity of implementation, the transmission of WUS can be based on the OFDM waveform. For example, a WUS signal sequence can be mapped to a segment of a continuous subcarrier of the OFDM symbol; and for example, a WUS signal sequence is mapped to a plurality of continuous physical resource blocks (PRB).

In embodiments of the present disclosure, the WUS signal sequence is mapped to a segment of continuous subcarrier of OFDM symbol, and the two ends of the continuous subcarrier include protection subcarriers, and no signal is transmitted on the protection subcarriers. That is, in order to support the UE to receive the WUS without initial synchronization and to prevent the WUS from being interfered by signals from adjacent subcarriers, some protection subcarriers can be set at both ends of the frequency domain position of the WUS mapping, i.e., there is a blank on these subcarriers and nothing is transmitted. For example, assuming that the WUS occupies 2 consecutive PRBs, the WUS signal sequence actually maps only 20 subcarriers in the 2 PRBs, leaving 2 protection subcarriers at each end of the frequency domain. In practical disclosure, those skilled in the art can set the number of protection subcarriers according to the actual situation, and embodiments of the present disclosure will not be limited here.

In embodiments of the present disclosure, the subcarrier spacing of WUS includes at least one of the following optional schemes:

1. a subcarrier interval of the initial downlink BWP configured in the cell system information block (SIB). That is, the subcarrier interval following the WUS can use the same subcarrier interval as the initial downlink BWP configured in the cell SIB.
2. a subcarrier interval indicated by a common subcarrier interval parameter configured in the physical broadcast channel (PBCH). That is, the subcarrier interval of WUS can use the subcarrier interval indicated by the common subcarrier spacing parameter subCarrierSpacingCommon configured in PBCH.
3. a subcarrier interval predefined based on a frequency band. That is, the subcarrier spacing of WUS can use the predefined subcarrier spacing, for example, for the low frequency band less than 6 GHz, WUS can use the fixed 15 kHz subcarrier spacing; for the high frequency band larger than 6 GHz, WUS can use the fixed 120 kHz subcarrier spacing, but not limited to this.
4. a subcarrier interval of the BWP in which the WUS is located. That is, the subcarrier interval following the WUS can use the subcarrier interval of the BWP in which the WUS is located, and it is assumed here that the WUS is configured based on the BWP.
5. a subcarrier interval configured specifically for the WUS. That is, the subcarrier interval following the WUS can use the subcarrier interval specifically configured for the WUS.

In embodiments of the present disclosure, the frequency domain position of the WUS is indicated according to at least one of the following parameters, i.e., the indication of the frequency domain position of the WUS may have the following optional schemes:

1. a frequency domain offset with respect to a common reference point of a cell resource block grid. That is, the start frequency domain position of the WUS is indicated by the offset with respect to the common reference point point A of the cell resource block grid;
2. a frequency domain offset with respect to the lowest frequency subcarrier or the highest frequency subcarrier of the BWP. That is, the start frequency domain position of the WUS is indicated by the offset of the lowest frequency subcarrier or the highest frequency subcarrier of the BWP; and
3. a frequency domain offset with respect to the lowest frequency subcarrier or the highest frequency subcarrier of the cell carrier bandwidth, wherein the cell carrier bandwidth is the cell carrier bandwidth based on the subcarrier spacing of the WUS. That is, the start frequency domain position of the WUS is indicated by the offset of the lowest frequency subcarrier or the highest frequency subcarrier with respect to the cell carrier bandwidth, wherein the cell carrier bandwidth is the cell carrier bandwidth based on the subcarrier spacing of the WUS, configured by the parameter SCS-SpecificCarrier in SIB.

In each of the above indication methods, the frequency domain offset based on the reference point is an upward or downward offset based on the reference point, for example, a downward offset based on the reference point, point A, etc. The indication of the offset is at the granularity of PRB, and the bandwidth size of one PRB is determined by the sub-carrier interval following the WUS.

In embodiments of the present disclosure, step S102 may specifically include: transmitting an acknowledge (ACK) after detecting the WUS; performing at least one of the following actions based on the detected WUS, after a fourth preset interval of transmitting the ACK.

That is, in embodiments of the present disclosure, if the UE detects the WUS, then the ACK is fed back to the network, as well as the DRX-onDurationTimer is started or monitoring the PDCCH is started after the fourth preset interval of transmitting the ACK, and the base station sends the scheduling information to the UE only after receiving the ACK of the WUS, and the ACK fed back by the UE has the advantage of avoiding the waste of resources caused by the base station continuously transmitting scheduling informa-tion to the UE in case of WUS miss detection.

In embodiments of the present disclosure, transmitting the ACK comprises at least one of the following ways:

1. transmitting the ACK via the Physical Uplink Control Channel (PUCCH). That is, the UE transmits ACK of WUS via PUCCH, the PUCCH source can be pre-configured by UE-specific RRC signaling, and the time slot used to transmit PUCCH is the first available uplink time slot after UE receives WUS satisfying the fourth preset interval, or the start symbol used to transmit PUCCH is the first available uplink symbol after the fourth preset interval after the WUS is received by the UE; and 2. transmitting an ACK via a dedicated physical signal sequence. That is, the UE transmits an ACK of the WUS through a physical signal sequence, wherein the ACK sequence of the WUS can be pre-configured by the UE-specific RRC signaling, and the time slot used for transmitting the PUCCH is the first available uplink time slot after the fourth preset interval is satisfied after the UE receives the WUS, or the start symbol for transmitting PUCCH is the first available uplink sym-bol after the fourth preset interval after the UE receives the WUS.

In the above scheme for transmitting ACK, the purpose of the preset interval is to reserve the processing time for the UE to receive WUS, and the preparation time for transmit-ting ACK, the size of the preset interval is predefined, and the system can predefine two different sizes of the preset interval to correspond to the UE of different capabilities, and the UE can report the size of the supported preset interval thereof to the network, and determine the time domain position of ACK according to the reported preset interval.

In embodiments of the present disclosure, a method performed by a base station is provided, and the method comprises:

Step S201: transmitting a WUS to a UE, wherein the WUS is configured to indicate that the UE performs at least one of the following actions:

starting or not starting a DRX-onDurationTimer at a start position of the corresponding DRX cycle;

starting the DRX timer after a first preset interval follow-ing the WUS, wherein the UE monitors the PDCCH during the operation of the DRX timer;

starting the PDCCH monitoring after a second preset interval following the WUS; and entering into a non-power-saving state from a power-saving state after a third preset interval following the WUS, wherein the UE does not transmit and receive signals and/or channels other than the WUS in the power-saving state, and the UE is able to transmit and receive signals and/or channels in the non-power-sav-ing state.

Similarly, the method of each embodiment of the present disclosure corresponds to the method of each embodiment of the UE side, and its detailed functional description and the resulting beneficial effects can be specifically described in the corresponding method shown in the embodiments of the UE side in the previous section, and will not be repeated here.

The embodiment of the present disclosure provides a user equipment (UE), which may specifically include a monitor-ing module and an execution module, wherein, the monitoring module is used to monitor the WUS;

the execution module is used to perform at least one of the following actions based on the detected WUS:

starting or not starting a DRX-onDurationTimer at a start position of the corresponding DRX cycle;

starting the DRX timer after a first preset interval follow-ing the WUS, wherein the UE monitors the PDCCH during the operation of the DRX timer;

starting the PDCCH monitoring after a second preset interval following the WUS; and entering into a non-power-saving state from a power-saving state after a third preset interval following the WUS, wherein the UE does not transmit and receive signals and/or channels other than the WUS in the power-saving state, and the UE is able to transmit and receive signals and/or channels in the non-power-sav-ing state.

Optionally, the corresponding DRX cycle comprises at least one of the followings:

a first DRX cycle after the WUS;

$N_1$ consecutive DRX cycles after the WUS, wherein $N_1$ is a positive integer and $N_1$ is predefined or pre-config-ured.

Optionally, when the DRX cycle is configured to include two sizes of DRX cycles, wherein the first DRX cycle is larger than the second DRX cycle, the corresponding DRX cycle comprises at least one of the followings:

a first "first DRX cycle" after the WUS;

a first "second DRX cycle" after WUS; or $N_1$ consecutive second DRX cycles after the WUS.

Optionally, the UE comprises a primary connection receiver (PCR) and a wake up receiver (WUR), wherein the PCR is configured to receive signals and/or channels other than the WUS, the WUR is configured to receive the WUS, the power-saving state is a state where the PCR is turned off and the non-power-saving state is a state where the PCR is turned on.

the monitoring module, when monitoring the WUS, is specifically configured for:

monitoring the WUS via the WUR;

the execution module, when entering into the non-power-saving state from the power-saving state, is specifically configured for; and starting the PCR.

Optionally, upon entering into the non-power-saving state from the power-saving state, a first activated downlink bandwidth part (BWP) or uplink BWP comprises at least one of the followings:

a pre-configured first activated BWP;

an initial BWP;

a default BWP;

a dormant BWP; or a first activated BWP after entering into a non-power-saving state.

Optionally, the execution module is further configured for: entering into the power-saving state from the non-power-saving state based on the received indication of the MAC CE or DCI.

Optionally, the monitoring module is further configured for at least one of the followings:

not monitoring the WUS during active time of DRX; or not monitoring the WUS in the non-power-saving state.

Optionally, a time domain position of the WUS is determined based on a reference position and a time domain offset with respect to the reference position:

the reference position comprises at least one of the followings: the start position of the corresponding DRX cycle; a reference synchronization signal block (SSB).

Optionally, the monitoring module, when monitoring the WUS, is specifically configured for: monitoring the WUS on at least one WUS resource within a WUS monitoring window.

Optionally, a time domain position of the WUS monitoring window is determined based on at least one of the followings:

a start position of the WUS monitoring window is determined based on the reference position and a time domain offset with respect to the reference position;

the start position of the WUS monitoring window is determined based on an end position of the WUS monitoring window, and a length of the WUS monitoring window;

the end position of the WUS monitoring window is determined based on the reference position and the time domain offset with respect to the reference position;

the end position of the WUS monitoring window is determined based on the start position of the WUS monitoring window, and the length of the WUS monitoring window;

the end position of the WUS monitoring window is determined based on the reference position and a minimum interval reported by the UE with respect to the reference position; and the reference position comprises at least one of the followings: a start position of the corresponding DRX cycle; a reference SSB.

Optionally, an indicative granularity of the time domain offset comprises at least one of wireless frame, time slot, or symbol, and then when the indicative granularity of the time domain offset is a wireless frame, the time domain offset is an offset of the wireless frame in which the WUS is located with respect to the wireless frame in which the reference position is located; when the indicative granularity of the time domain offset is a time slot, the time domain offset is an offset of the time slot in which the WUS is located with respect to the time slot in which the reference position is located; when the granularity of the time domain offset is a symbol, the time domain offset is the offset of the start symbol of the WUS with respect to the start symbol in which the reference position is located.

Optionally, when the indicative granularity of the time domain offset is a wireless frame, the time domain position of the WUS is also determined based on the WUS position information within the wireless frame indicated by the base station; when the indicative granularity of the time domain offset is a time slot, the time domain position of the WUS is also determined based on the WUS position information within the time slot indicated by the base station.

Optionally, an interval between the time domain position of the WUS and the reference position is not less than a predetermined interval; and/or an interval between the end position of the WUS monitoring window and the reference position is not less than the predetermined interval, wherein the predetermined interval is a predefined minimum interval, or a minimum interval reported by the UE.

Optionally, the reference SSB comprises at least one of the followings:

a first SSB with an interval not less than the predetermined interval prior to the corresponding DRX cycle;

an $N_2$th SSB with an interval not less than the predetermined interval prior to the corresponding DRX cycle, wherein Na is a positive integer; and a first SSB among $N_3$ consecutive SSBs, wherein $N_3$ is a positive integer.

Optionally, the time domain position of at least one WUS resource within the WUS monitoring window is determined based on at least one of the followings:

time domain interval information between two adjacent WUS resources, wherein, the start position of the WUS monitoring window is the start position of a first WUS resource; or bitmap information configured to indicate the presence or absence of the WUS resource on each time unit within the WUS monitoring window.

Optionally, the execution module, when starting the DRX timer after the first preset interval following the WUS, is specifically configured for: starting the DRX timer after the first preset interval starting from the end position of the WUS monitoring window.

Optionally, the execution module, when starting the PDCCH monitoring after a second preset interval following the WUS, is specifically configured for: starting PDCCH monitoring after the second preset interval starting from the end position of the WUS monitoring window.

Optionally, the execution module, when entering into the non-power-saving state from the power-saving state after a third preset interval following the WUS, is specifically configured for: entering into the non-power-saving state from the power-saving state after the third predetermined interval starting from the end position of the WUS monitoring window.

Optionally, the WUS is carried by a physical signal sequence.

Optionally, the WUS signal sequence is configured to carry at least one of the following status information:

an indication that the UE starts the DRX-onDuration-Timer at the start position of the corresponding DRX cycle; or an indication that the UE does not start DRX-onDurationTimer at the start position of the corresponding DRX cycle.

Optionally, carrying by the physical signal sequence comprises at least one of the followings:

carrying, by a WUS signal sequence, status information for instructing that the UE starts the DRX-onDuration-Timer at the start position of the corresponding DRX cycle;

carrying, by a WUS signal sequence, status information for instructing that the UE does not start the DRX-onDurationTimer at the start position of the corresponding DRX cycle; or carrying, by a first WUS signal sequence, status information for instructing that the UE starts the DRX-onDurationTimer at the start position of the corresponding DRX cycle, and carrying, by a second WUS signal sequence, status information for instructing that the UE does not start the DRX-onDurationTimer at the start position of the corresponding DRX cycle.

Optionally, the WUS signal sequence is an M sequence or a Gold sequence.

Optionally, the WUS signal sequence is generated and/or scrambled based on at least one of the following parameters:

a physical cell ID;

a C-RNTI of the UE;

an index number of the system frame in which the start position of the DRX cycle associated with the WUS is located;

an index number of the time slot in which the start position of the DRX cycle associated with the WUS is located;

an index number of the symbol in which the start position of the DRX cycle associated with the WUS is located;

an index number of the system frame in which the start position of the reference SSB associated with the WUS is located;

an index number of the time slot in which the start position of the reference SSB associated with the WUS is located;

an index number of the symbol in which the start position of the reference SSB associated with the WUS is located;

an index number of the system frame in which the start position of the WUS is located;

an index number of the time slot in which the start position of the WUS is located; or an index number of the symbol in which the start position of the WUS is located.

Optionally, the WUS signal sequence is mapped to a segment of continuous subcarrier of orthogonal frequency division multiplexing (OFDM) symbol, wherein two ends of the continuous subcarrier include a protection subcarrier, and no signal is transmitted on the protection subcarrier.

Optionally, the subcarrier spacing of the WUS comprises at least one of the followings:

a subcarrier interval of the initial downlink BWP configured in the cell system information block (SIB);

a subcarrier interval indicated by a common subcarrier interval parameter configured in the Physical Broadcast Channel (PBCH);

a subcarrier interval predefined based on a frequency band;

a subcarrier interval of the BWP in which the WUS is located; or a subcarrier interval configured specifically for the WUS.

Optionally, a frequency domain position of the WUS is indicated according to at least one of the following parameters:

a frequency domain offset with respect to a common reference point of a cell resource block grid;

a frequency domain offset with respect to the lowest frequency subcarrier or the highest frequency subcarrier of the BWP; or a frequency domain offset with respect to the lowest frequency subcarrier or the highest frequency subcarrier of the cell carrier bandwidth, wherein the cell carrier bandwidth is the cell carrier bandwidth based on the subcarrier spacing of the WUS.

Optionally, the execution module, when performing at least one of the following actions based on the detected WUS, is specifically configured for:

transmitting an Acknowledge (ACK) after detecting the WUS; or performing at least one of the following actions based on the detected WUS, after a fourth preset interval of transmitting the ACK.

Optionally, the execution module, when transmitting the ACK, is specifically configured for:

transmitting the ACK via the physical uplink control channel (PUCCH); or transmitting an ACK via a dedicated physical signal sequence.

According to a further aspect of the present disclosure, a base station is provided, and the base station may comprise a transmission module configured to transmit a WUS to the UE, wherein the WUS is used for instructing the UE to perform at least one operation of the followings:

starting or not starting a DRX-onDurationTimer at a start position of the corresponding discontinuous reception (DRX) cycle;

starting a DRX timer after a first preset interval following the WUS, wherein the UE monitors the PDCCH during the operation of the DRX timer;

starting a PDCCH monitoring after a second preset interval following the WUS; or entering into a non-power-saving state from a power-saving state after a third preset interval following the WUS, wherein the UE does not transmit and receive signals and/or channels other than the WUS in the power-saving state, and the UE is able to transmit and receive signals and/or channels in the non-power-saving state.

The user equipment and the base station in embodiments of the present disclosure can implement the methods provided in the embodiments of the present disclosure, and their implementation principles are similar. The actions performed by the modules in the user equipment and the base station in embodiments of the present disclosure correspond to the steps in the methods in the embodiments of the application. For the detailed functional description of each module of the user equipment and the base station and the beneficial effects generated, please refer to the description in the corresponding method shown in the previous part, which will not be repeated here.

The embodiments of the present disclosure provide an electronic device, which comprises a transceiver for transmitting and receiving signals; and a processor, which is coupled with a transceiver and configured to control to implement the steps of the above described embodiments of the methods. Optionally, the electronic device may be a UE, and the processor in the electronic device is configured to perform control to implement the steps of the method performed by the UE as provided in the embodiments of the preceding method. Optionally, the electronic device may be a base station, and the processor in the electronic device is configured to perform control to implement the steps of the method performed by the base station as provided in the embodiments of the preceding method.

Figure 12:
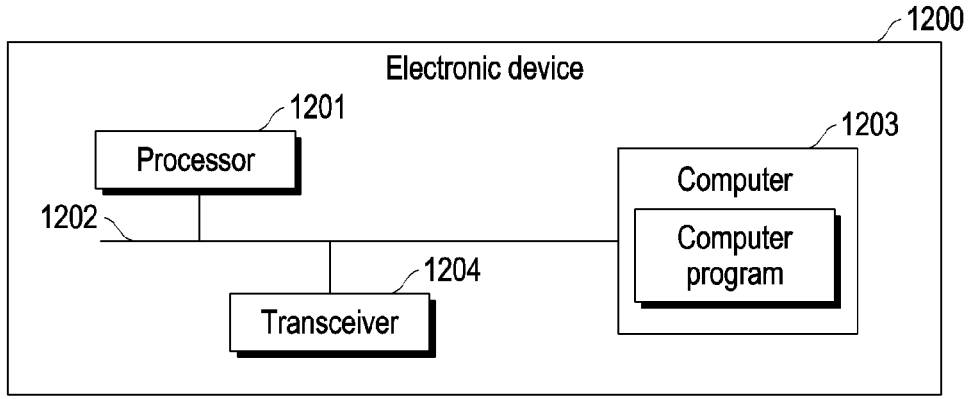
FIG. 12 illustrates a structure of an electronic device according to embodiments of the present disclosure.

In an optional embodiment, an electronic device is provided, as shown in FIG. 12, wherein the electronic device 1200 shown in FIG. 12 includes a processor 1201 and a memory 1203. Wherein, the processor 1201 communicates with the memory 1203, e.g., via a bus 1202. Optionally, the electronic device 1200 may also include a transceiver 1204, which may be used for data interaction between this electronic device and other electronic devices, such as data transmission and/or data reception. It should be noted that the transceiver 1204 is not limited to one in practical applications, and the structure of the electronic device 1200 does not constitute a limitation of this application embodiment.

The processor 1201 may be a central processing unit (CPU), a general-purpose processor, a digital signal processor (DSP), an application specific integrated circuit (ASIC), and a field programmable gate array (FPGA), or other programmable logic devices, transistor logic device, hardware component, or any combination thereof. It is possible to implement or execute the various exemplary logical blocks, modules, and circuits described in combination with the disclosures of the present disclosure. The processor 1201 may also be a combination of computing functions, such as a combination of one or more microprocessors, a combination of a DSP and a microprocessor, and so on.

The bus 1202 can include a path for delivering information among the above components. The bus 1202 may be a peripheral component interconnect (PCI) bus or an extended industry standard architecture (EISA) bus. The bus 1202 may be divided into an address bus, a data bus, a control bus, and so on. For ease of illustration, only one bold line is shown in FIG. 12, but does not indicate that there is only one bus or type of bus.

The memory 1203 may be a read-only memory (ROM) or other types of static storage devices that can store static information and instructions, a random access memory (RAM) or other types of storage devices that can store information and instructions. The memory 1203 may also be electrically erasable programmable read-only memory (EE-PROM), compact disc read-only memory (CD-ROM), or other optical disk storage, optical disk storage (including compressed compact disc, laser disc, compact disc, digital versatile disc, blue-ray disc, etc.), magnetic disk storage medium or other magnetic storage devices, or any other medium capable of carrying or storing computer programs and capable of being accessed by a computer, but not limited to this.

The memory 1203 is used to store computer programs for executing embodiments of the present disclosure and is controlled for execution by the processor 1201. The processor 1201 is used to execute the computer program stored in memory 1203 to implement the steps shown in the preceding method embodiment.

Embodiments of the present disclosure provide a computer-readable storage medium having a computer program stored on the computer-readable storage medium, the computer program, when executed by a processor, implements the steps and corresponding contents of the foregoing method embodiments.

Embodiments of the present disclosure also provide a computer program product including a computer program, the computer program when executed by a processor realizing the steps and corresponding contents of the preceding method embodiments.

The terms "first," "second," "third," "fourth," "1," "2," etc. (if present) in the specification and claims of this application and the accompanying drawings above are used to distinguish similar objects and need not be used to describe a particular order or sequence. It should be understood that the data so used is interchangeable where appropriate so that embodiments of the present disclosure described herein can be implemented in an order other than that illustrated or described in the text.

It should be understood that while the flow diagrams of embodiments of the present disclosure indicate the individual operational steps by arrows, the order in which these steps are performed is not limited to the order indicated by the arrows. Unless explicitly stated herein, in some implementation scenarios of embodiments of the present disclosure, the implementation steps in the respective flowcharts may be performed in other orders as desired. In addition, some, or all of the steps in each flowchart may include multiple sub-steps or multiple phases based on the actual implementation scenario. Some or all of these sub-steps or stages can be executed at the same moment, and each of these sub-steps or stages can also be executed at different moments separately. The order of execution of these sub-steps or stages can be flexibly configured according to requirements in different scenarios of execution time, and the embodiments of the present disclosure are not limited thereto.

The above-mentioned description is merely an alternative embodiment for some implementation scenarios of the present disclosure, and it should be noted that it would have been within the scope of protection of embodiments of the present disclosure for those skilled in the art to adopt other similar implementation means based on the technical idea of the present disclosure without departing from the technical concept of the solution of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE), the method comprising:

monitoring a wake up signal (WUS) via a wake up receiver (WUR) of the UE in a radio resource control (RRC) connected mode of the UE;

starting a DRX-onDurationTimer at a start position of a discontinuous reception (DRX) cycle based on the WUS, wherein the DRX cycle and a cycle of the WUS are configured independently; and entering into a non-power-saving state from a power-saving state, wherein the power-saving state is a state in which a primary connection receiver (PCR) of the UE is turned off and the non-power-saving state is a state in which the PCR of the UE is turned on, wherein the PCR is configured to receive signals or channels other than the WUS, and the WUR is configured to receive the WUS.

2. The method according to claim 1, wherein DRX cycle comprises at least one of:

a first DRX cycle after the WUS; or $N_1$ consecutive DRX cycles after the WUS, $N_1$ being a positive integer and $N_1$ predefined or pre-configured.

3. The method according to claim 2, wherein when the DRX cycle is configured to comprise two sizes of DRX cycles, and a first DRX cycle is larger than a second DRX cycle, the DRX cycle comprises at least one of:

the first DRX cycle after the WUS;

a second DRX cycle after the WUS; or $N_1$ consecutive second DRX cycles after the WUS.

4. The method according to claim 1, wherein upon entering into a non-power-saving state from a power-saving state, a first activated downlink bandwidth part (BWP) or uplink BWP comprises at least one of:

a pre-configured first activated BWP;

an initial BWP;

a default BWP;

a dormant BWP; or the first activated BWP after entering into the non-power-saving state.

5. The method according to claim 1, further comprising:

entering into a power-saving state from a non-power-saving state based on received indication of medium access control (MAC) control element (CE) or downlink control information (DCI).

6. The method according to claim 1, further comprising at least one of:

not monitoring the WUS during an active time of DRX; or not monitoring the WUS in a non-power-saving state.

7. The method according to claim 1, wherein a time domain position of the WUS is determined based on a reference position and a time domain offset associated with the reference position; and wherein, the reference position comprises the start position of the DRX cycle.

8. The method according to claim 1, wherein monitoring the WUS comprises:

monitoring the WUS on at least one WUS resource within a WUS monitoring window.

9. The method according to claim 8, wherein a time domain position of the WUS monitoring window is determined based on an end position of the WUS monitoring window is determined based on a reference position and a minimum interval reported by the UE associated with the reference position, and wherein, the reference position comprises the start position of the DRX cycle.

10. The method according to claim 9, wherein an indicative granularity of a time domain offset associated with the reference position comprises at least one of a wireless frame, a time slot, or a symbol, and when the indicative granularity of the time domain offset is the wireless frame, the time domain offset is an offset of the wireless frame in which the WUS is located with respect to the wireless frame in which the reference position is located;

when the indicative granularity of the time domain offset is the time slot, the time domain offset is an offset of the time slot in which the WUS is located with respect to the time slot in which the reference position is located; and when the indicative granularity of the time domain offset is the symbol, the time domain offset is an offset of a start symbol of the WUS with respect to a start symbol in which the reference position is located.

11. The method according to claim 10, wherein:

when the indicative granularity of the time domain offset is the wireless frame, the time domain position of the WUS is determined based on WUS position information within the wireless frame indicated by a base station; and when the indicative granularity of the time domain offset is the time slot, the time domain position of the WUS is determined based on the WUS position information within the time slot indicated by the base station.

12. The method according to claim 9, wherein, an interval between the time domain position of the WUS and the reference position is not less than a predetermined interval; or an interval between an end position of the WUS monitoring window and the reference position is not less than the predetermined interval, and wherein the predetermined interval is a predefined minimum interval or a minimum interval reported by the UE.

13. The method according to claim 9, wherein a reference synchronization signal block (SSB) comprises at least one of:

a first SSB prior to the DRX cycle with an interval not less than a predetermined interval;

an $N_2$th SSB prior to the DRX cycle with an interval not less than a predetermined interval, wherein $N_2$ is a positive integer; or a first SSB among $N_3$ consecutive SSBs, $N_3$ being a positive integer.

14. The method according to claim 8, wherein a time domain position of at least one WUS resource within the WUS monitoring window is determined based on at least one of:

time domain interval information between two adjacent WUS resources, the start position of the WUS monitoring window being the start position of a first WUS resource; or bitmap information configured to indicate a presence or an absence of the WUS resource on each time unit within the WUS monitoring window.

15. The method according to claim 8, wherein:

starting a DRX timer after a first preset interval following the WUS comprises starting the DRX timer after the first preset interval starting from an end position of the WUS monitoring window;

starting a physical downlink control channel (PDCCH) monitoring after a second preset interval following the WUS comprises starting the PDCCH monitoring after the second preset interval starting from the end position of the WUS monitoring window; and entering into a non-power-saving state from a power-saving state after a third preset interval following the WUS comprises entering into the non-power-saving state from the power-saving state after a third predetermined interval starting from the end position of the WUS monitoring window.

16. A user equipment (UE), comprising:

a transceiver; and a processor coupled to the transceiver and configured to:

monitor a wake up signal (WUS) via a wake up receiver (WUR) of the UE in a radio resource control (RRC) connected mode of the UE;

start a DRX-onDurationTimer at a start position of a discontinuous reception (DRX) cycle based on the WUS, wherein the DRX cycle and a cycle of the WUS are configured independently; and enter into a non-power-saving state from a power-saving state, wherein the power-saving state is a state in which a primary connection receiver (PCR) of the UE is turned off and the non-power-saving state is a state in which the PCR of the UE is turned on, wherein the PCR is configured to receive signals or channels other than the WUS, and the WUR is configured to receive the WUS.

17. A non-transitory computer-readable storage medium having computer programs stored therein that, when executed by a processor, cause the processor to:

monitor a wake up signal (WUS) via a wake up receiver (WUR) of a user equipment in a radio resource control (RRC) connected mode of the UE;

start a DRX-onDurationTimer at a start position of a discontinuous reception (DRX) cycle based on the WUS, wherein the DRX cycle and a cycle of the WUS are configured independently; and enter into a non-power-saving state from a power-saving state, wherein the power-saving state is a state in which a primary connection receiver (PCR) of the UE is turned off and the non-power-saving state is a state in which the PCR of the UE is turned on, wherein the PCR is configured to receive signals or channels other than the WUS, and the WUR is configured to receive the WUS.

* * * * *